United States Patent
Sakagami et al.

(10) Patent No.: US 8,714,451 B2
(45) Date of Patent: May 6, 2014

(54) IMAGE FORMING APPARATUS MANAGEMENT SYSTEM, IMAGE FORMING APPARATUS, MANAGING APPARATUS, TERMINAL APPARATUS, IMAGE FORMING APPARATUS MANAGING METHOD, AND IMAGE FORMING PROGRAM

(75) Inventors: Atsushi Sakagami, Kanagawa (JP); Naoto Sakurai, Saitama (JP); Koji Sasaki, Kanagawa (JP); Daiya Miyasaka, Chiba (JP); Tomoko Nishizawa, Tokyo (JP); Yasuhiko Tsugawa, Kanagawa (JP); Yohei Ono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1223 days.

(21) Appl. No.: 12/029,120

(22) Filed: Feb. 11, 2008

(65) Prior Publication Data

US 2008/0231887 A1 Sep. 25, 2008

(30) Foreign Application Priority Data

Mar. 23, 2007 (JP) ................... 2007-077763

(51) Int. Cl.
*G06F 17/00* (2006.01)
*G06K 15/00* (2006.01)
*G06K 7/10* (2006.01)
*G06K 19/00* (2006.01)
*G06F 13/00* (2006.01)

(52) U.S. Cl.
USPC ........... 235/454; 235/375; 235/383; 235/487; 358/1.16; 711/100

(58) Field of Classification Search
USPC ......... 235/375, 383, 487, 492, 454; 358/1.16; 711/100
See application file for complete search history.

(56) References Cited

U.S. PATENT DOCUMENTS

| | | | | |
|---|---|---|---|---|
| 2003/0086111 | A1* | 5/2003 | Akiyoshi | 358/1.14 |
| 2005/0275864 | A1* | 12/2005 | Sugimura et al. | 358/1.13 |
| 2006/0151607 | A1* | 7/2006 | Horikiri et al. | 235/454 |
| 2007/0206216 | A1* | 9/2007 | Sakagami et al. | 358/1.15 |

FOREIGN PATENT DOCUMENTS

| | | |
|---|---|---|
| JP | 6-214992 | 8/1994 |
| JP | 2001-60184 A | 3/2001 |
| JP | 2001-306526 | 11/2001 |
| JP | 2003-330686 A | 11/2003 |
| JP | 2004-29946 | 1/2004 |

(Continued)

OTHER PUBLICATIONS

Office Action issued Jun. 28, 2011 in Japan Application No. 2007-077763.

(Continued)

*Primary Examiner* — Michael G Lee
*Assistant Examiner* — Laura Gudorf
(74) *Attorney, Agent, or Firm* — Oblon, Spivak, McClelland, Maier & Neustadt, L.L.P.

(57) ABSTRACT

A disclosed managing apparatus and image forming apparatus management system ensure confidentiality of information in an image forming apparatus while usability is maintained. An image forming apparatus acquires IC card identifying information with an IC card reader. A management server acquires a user ID associated with the acquired IC card identifying information and use limit information concerning use of the image forming apparatus. A process is performed in the image forming apparatus in accordance with the use limit information.

18 Claims, 28 Drawing Sheets

(56) References Cited

FOREIGN PATENT DOCUMENTS

| | | |
|---|---|---|
| JP | 2004-222141 | 8/2004 |
| JP | 2004-318546 A | 11/2004 |
| JP | 2004-318547 A | 11/2004 |
| JP | 2006-107316 A | 4/2006 |
| JP | 2006-171914 | 6/2006 |
| JP | 2006-202063 | 8/2006 |
| JP | 2007-4372 | 1/2007 |
| JP | 2007-235713 | 9/2007 |

OTHER PUBLICATIONS

Office Action issued Apr. 5, 2011, in Japan Patent Application No. 2007-077763.
Japanese Office Action Issued Apr. 23, 2013 in Patent Application No. 2012-054908.
Office Action issued Jun. 11, 2013 in Japanese Patent Application No. 2011-124031.
Office Action issued Feb. 12, 2014, in Japanese Patent Application No. 2011-124031.

\* cited by examiner

FIG.14A

| | 0 | | | 7 | 8 | 9 | 10 | 11 | | | | 15 |
|---|---|---|---|---|---|---|---|---|---|---|---|---|
| 0 | CARD IDENTIFYING INFORMATION ||||||||||||
| 1 | (1) EMPLOYEE NO. |||||||| (2) NUMBER OF TIMES OF ISSUANCE ||| – |
| 2 | (3) ISSUE DATE |||||||| – ||||
| 3 | | | | | | | | (4) EXPIRATION DATE |||||
| 4 | : : ||||||||||||

| No. | ITEM | BLOCK NO. | START | END | DIGITS | ATTRIBUTES | | CHARACTER CODE | VALUE |
|---|---|---|---|---|---|---|---|---|---|
| ① | EMPLOYEE NO. | 1 | 0 | 9 | 10 | FIXED | | ASCII | P000445566 |
| ② | NUMBER OF TIMES OF ISSUANCE | 1 | 10 | 11 | 2 | FIXED | | ASCII | 01 |
| ③ | ISSUE DATE | 2 | 0 | 7 | 8 | FIXED | | ASCII | 20070206 |
| ④ | EXPIRATION DATE | 3 | 8 | 15 | 8 | FIXED | | ASCII | 20101231 |

FIG.26A Abnormality in communication status of service within control terminal (LED 2 blinks at regular intervals)

FIG.26B Disc capacity alert for a local disc in control terminal (LED 2 blinks twice at regular intervals)

FIG.26C Abnormality in IC card device (LED 2 blinks three times at regular intervals)

FIG.26D Abnormality in device status (LED 3 blinks at regular intervals)

FIG.26E Abnormality in communication status with print server (LED 3 blinks twice at regular intervals)

FIG.26F Abnormality in communication status with management server (LED 3 blinks three times at regular intervals)

FIG.26G Control terminal internal error (LEDs 2 and 3 blink at the same regular intervals)

FIG.26H Abnormality in service communication status in print server (LED 3 blinks four times at regular intervals)

FIG.26I Disc capacity alert for print server (LED 3 blinks five times at regular intervals)

FIG.26J Database capacity alert for print server (LED 3 blinks six times at regular intervals)

FIG.26K Abnormality in service communication status of management server (LED 3 blinks seven times at regular intervals)

FIG.26L Disc capacity alert for management server (LED 3 blinks eight times at regular intervals)

FIG.26M Database capacity alert for management server (LED 3 blinks nine times at regular intervals)

FIG.27A Abnormality in communication status with print server
(LED 3 repeats blinking twice at longer intervals and twice at shorter intervals)

FIG.27B Abnormality in service communication status in print server
(LED 3 repeats blinking four times at longer intervals and twice at shorter intervals)

FIG.27C Disc capacity alert for print server
(LED 3 repeats blinking five times at longer intervals and twice at shorter intervals)

FIG.27D Database capacity alert for print server
(LED 3 repeats blinking six times at longer intervals and twice at shorter intervals)

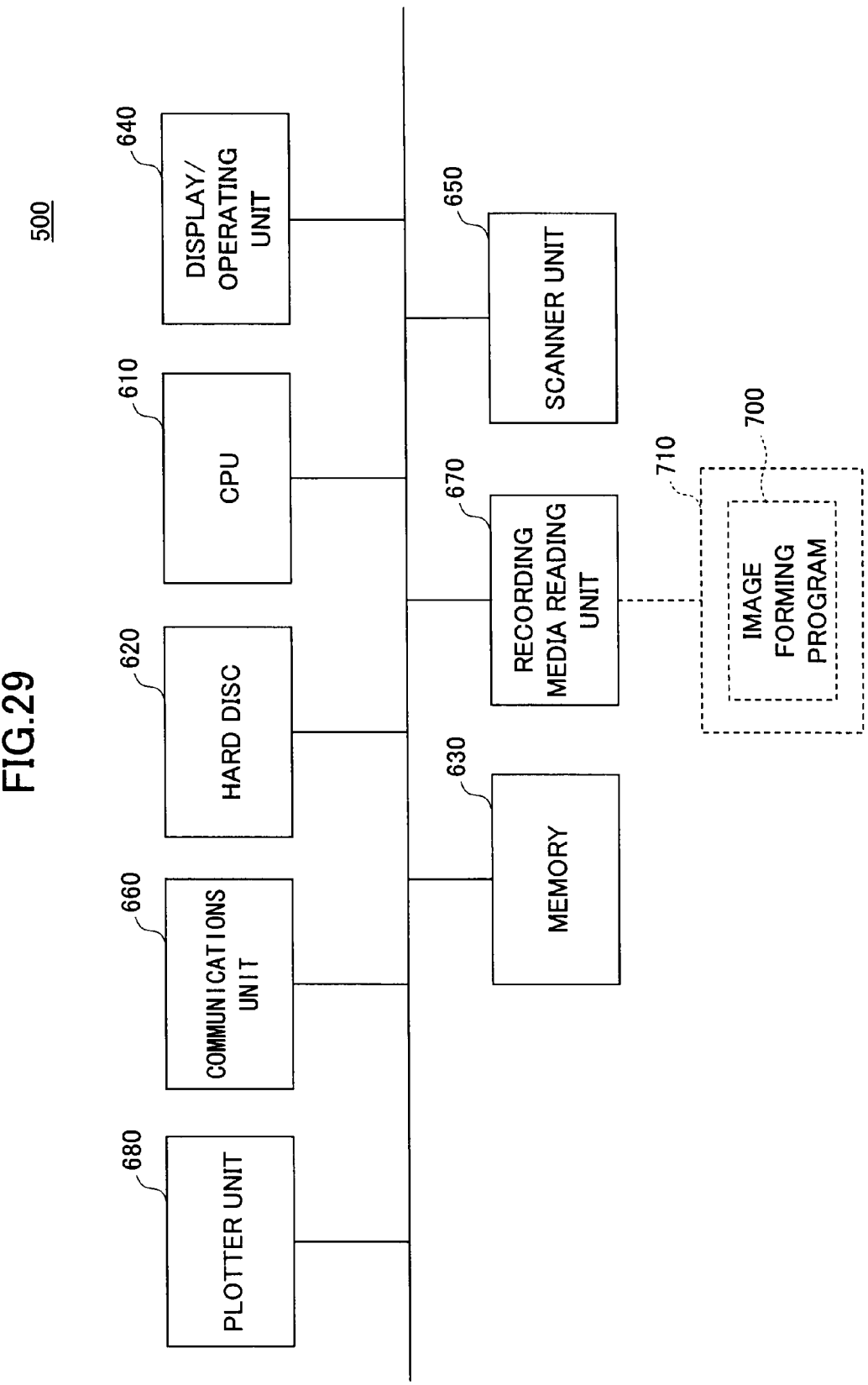

IMAGE FORMING APPARATUS MANAGEMENT SYSTEM, IMAGE FORMING APPARATUS, MANAGING APPARATUS, TERMINAL APPARATUS, IMAGE FORMING APPARATUS MANAGING METHOD, AND IMAGE FORMING PROGRAM

BACKGROUND OF THE INVENTION

1. Field of the Invention

The present invention relates to systems for managing processes in an image forming apparatus, such as a multifunction peripheral (MFP). It also relates to image forming apparatus, managing apparatus, terminal apparatus, methods of managing image forming apparatus, and image forming programs.

2. Description of the Related Art

It has become common in corporations and other organizations to connect an image forming apparatus (including an MFP having the functions of a FAX machine, a scanner, a copier, etc.) to multiple computer terminals via a network so that the image forming apparatus can be shared. In such an environment, it is necessary to maintain the confidentiality of image data handled over the network. Further, since the image forming apparatus is shared by multiple users, there is a need to improve the efficiency of its use.

Japanese Laid-Open Patent Application No. 2004-222141 discloses an invention directed to a network scanner apparatus comprising an address information storage unit in which address information is set or registered, the address information being associated with individual addresses to which data is distributed via a network. The address information comprises at least a user name, a password, distribution information, and information about other addresses that a user at a particular address can access. User authentication is performed based on a pair of a user name and a password stored in the address information storage unit, and access is granted only to a successfully authenticated user.

However, in this technology, when the image data of a scanned manuscript is transferred to a terminal at a particular address, the image data could be viewed by unintended persons if the terminal is shared by plural users.

Furthermore, in the technology of the aforementioned publication, use of the network scanner device is allowed to any user who has been authenticated. If such technology is applied to the latest image forming apparatus having the functions of a FAX machine, a copier, and so on as well as a scanner, the image forming apparatus could potentially be used for unintended purposes.

SUMMARY OF THE INVENTION

It is therefore a general object of the present invention to overcome the aforementioned problems of the related art.

A more specific object is to provide a managing apparatus which makes it possible to keep information secret in an image forming apparatus and an image forming apparatus management system.

SUMMARY OF THE INVENTION

In one aspect, the invention provides an image forming apparatus management system in which an image forming apparatus configured to read user identifying information from an information recording medium is connected to a managing apparatus for managing use of the image forming apparatus via a network. The image forming apparatus comprises an information reading unit configured to read the user identifying information recorded in a predetermined region of the information recording medium; a region setting unit configured to set the predetermined region from which the user identifying information is read by the information reading unit; and an information format conversion unit configured to convert the user identifying information read by the information reading unit into a predetermined format. The managing apparatus comprises a user information storage unit in which the user identifying information that has been converted into the predetermined format and use limit information concerning use of the image forming apparatus that is associated with the user identifying information are stored; and a use limit information acquiring unit configured to acquire the use limit information associated with the user identifying information based on the user identifying information.

In another aspect, the invention provides an image forming apparatus managing method adapted to an image forming apparatus management system in which an image forming apparatus configured to read user identifying information from an information recording medium is connected to a managing apparatus for managing the image forming apparatus via a network. The managing apparatus comprises a user information storage device in which the user identifying information and use limit information concerning use of the image forming apparatus that is associated with the user identifying information are stored. The method comprises the steps of reading user identifying information recorded in a predetermined region of the information recording medium; setting the predetermined region from which the user identifying information is read; converting the user identifying information that has been read into a predetermined format; and acquiring the use limit information associated with the user identifying information based on the user identifying information that has been converted into the predetermined format.

In another aspect, the invention provides a computer-readable image forming program for an image forming apparatus connected to a managing apparatus for managing use of the image forming apparatus. The image forming apparatus comprises a processing unit and a storage unit. The image forming program is configured to cause the processing unit to carry out the steps of reading user identifying information recorded in a predetermined region of an information recording medium; setting the predetermined region from which the user identifying information is read; and converting the user identifying information that has been read into a predetermined format.

In accordance with the invention, the functions of an image forming apparatus is limited on an individual user basis, whereby user information can be managed in a secure manner and confidentiality of such information can be maintained.

These and other objects, features and advantages of the invention will be apparent to those skilled in the art from the following detailed description of the invention, when read in conjunction with the accompanying drawings and appended claims.

BRIEF DESCRIPTION OF THE DRAWINGS

FIG. 14A shows a format of an IC card;

FIG. 14B shows various items of information stored in the IC card;

FIGS. 26A through 26M show various patterns of light emitted by LEDs and displayed on a display unit 313, indicating various states of an image forming apparatus management system;

FIG. 27A through 27D show various patterns of light emitted by LEDs indicating various states of a second print server in a case where plural print servers are connected according to the fourth embodiment;

FIG. 29 shows a diagram for describing a recording medium in which a program for realizing the various functions of the image forming apparatus according to the various embodiments is recorded.

DETAILED DESCRIPTION OF THE PREFERRED EMBODIMENTS

In accordance with a managing apparatus and an image forming apparatus management system of the present invention, use limit information relating to use of an image forming apparatus and being associated with user identifying information are acquired, and then a process is performed in the image forming apparatus based on the use limit information.

Embodiment 1

In the following, a first embodiment of the present invention is described with reference to the drawings.

Figure 1:
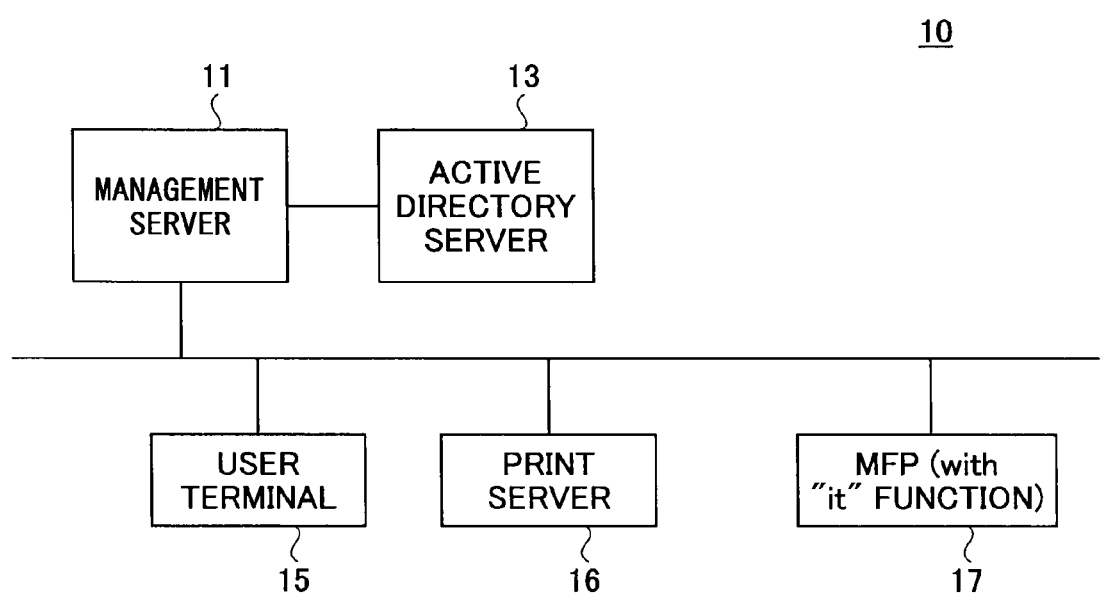
FIG. 1 shows a system configuration of an image forming apparatus management system according to a first embodiment.

FIG. 1 shows a system configuration of an image forming apparatus management system 10 according to the first embodiment of the present invention. The image forming apparatus management system 10 comprises a management server 11, an Active Directory server ("AD server" hereafter) 13, a user terminal 15, a print server 16, and an image forming apparatus 17, which are connected via a network.

In the image forming apparatus management system 10, user identifying information acquired by the image forming apparatus 17 is transmitted to the management server 11. Based on the user identifying information, the management server 11 acquires use limit information associated with the user concerning use of the image forming apparatus 17. The acquired use limit information is then transmitted to the image forming apparatus 17. Based on the use limit information, use of the image forming apparatus 17 by the user is controlled on an individual user basis.

The management server 11 is thus a managing apparatus configured to manage user information and control use of the image forming apparatus 17. The details of the management server 11 will be described later. The AD server 13 retains user ID information for identifying each user of the image forming apparatus 17. The user ID information retained in the AD server 13 may be registered in advance by an administrator of the image forming apparatus management system 10 or by each user using the user terminal 15, for example.

In the management server 11, it can be selected whether or not a user authenticating process for allowing use of the image forming apparatus 17 should be performed based on the user ID information retained in the AD server 13, depending on the setting of the management server 11.

The user terminal 15 is used to select a document in the image forming apparatus 17 for printing and to enter a print instruction, for example. The user terminal 15 may comprise a computer having a CPU and a memory. A user can change various settings or conditions in the management server 11 using a browser in the user terminal 15. The print server 16 temporarily retains a print job which is a print command transmitted from the user terminal 15 to be executed in the image forming apparatus 17. The details of the print server 16 are described later.

The image forming apparatus 17 comprises an MFP (multifunction peripheral) capable of providing the functions of a FAX machine, a scanner, a copier, and a printer, for example. The image forming apparatus 17 includes an IC card reader for acquiring IC card identifying information.

In the following, the details of the image forming apparatus 17, the management server 11, and the print server 16 are described with reference to FIGS. 2 through 4.

Figure 2:
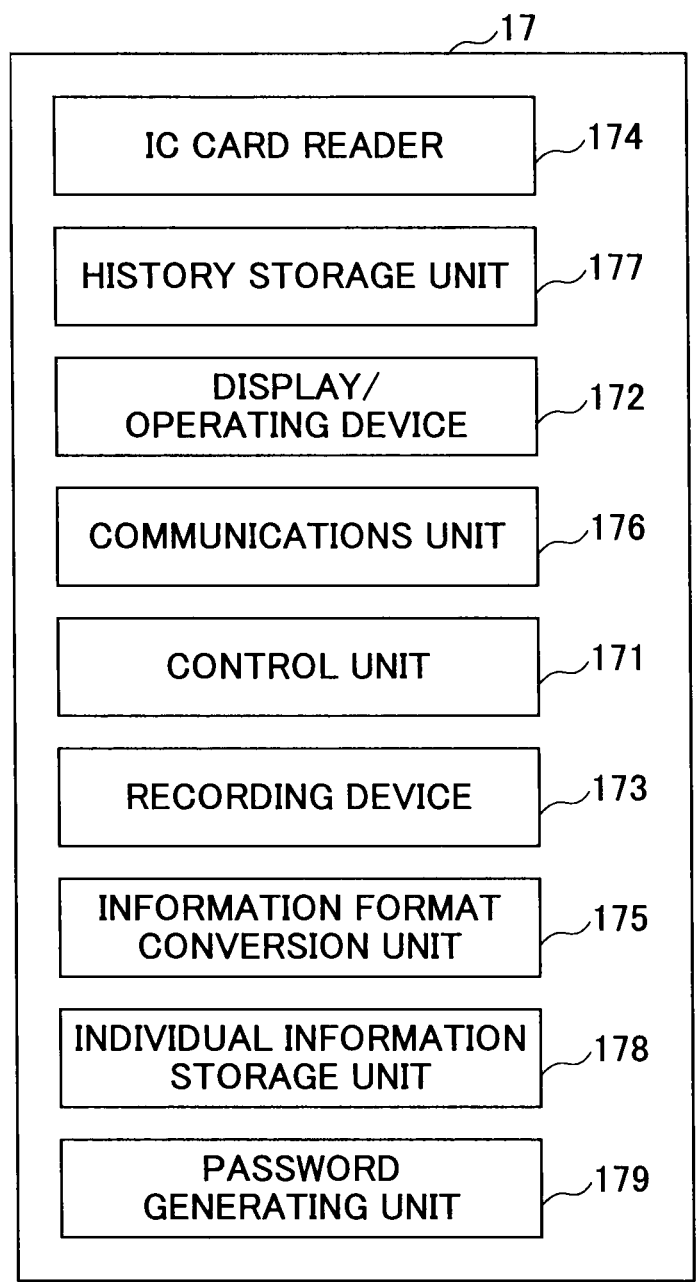
FIG. 2 shows a functional block diagram of an image forming apparatus in the first embodiment.

FIG. 2 shows a functional block diagram of the image forming apparatus 17 of the present embodiment. The image forming apparatus 17 comprises a control unit 171, a display/operating device 172, a recording device 173, an IC card reader 174, an information format converting unit 175, a communications unit 176, an executed process history storing unit 177, an individual information storing unit 178, and a password generating unit 179.

The control unit 171 is configured to execute or control processes for realizing the aforementioned functions of a FAX machine, scanner, copier, and printer. The display/operating device 172 is used to operate the image forming apparatus 17; it may comprise a numeric keypad or an operating panel. Preferably, the display/operating device 172 includes a display unit for displaying to a user various states of the image forming apparatus 17 or a list of processes performed by the image forming apparatus 17, for example.

The recording device 173 stores setting values for the image forming apparatus 17 and image data or electronic documents read by the image forming apparatus 17. The IC card reader 174 is configured to acquire unique IC card identifying information recorded in a user's IC card. While the IC card reader 174 of the present embodiment is of a contactless type capable of acquiring the IC card information without making contact with an IC card, it may be of a contact type which acquires IC card information by making contact with an IC card. Further, while the IC card reader 174 of the present embodiment is part of the image forming apparatus 17, the IC card reader 174 may be connected outside the image forming apparatus 17 by an appropriate connection method.

The information format converting unit 175 is configured to convert the format of the IC card identifying information acquired by the IC card reader 174. The present embodiment employs a FeliCa (registered trademark of Sony Corporation, referring to a contactless IC chip card system) card for the IC card, and so the IC card identifying information acquired by the IC card reader 174 and used in processes executed in the present embodiment is in the FeliCa (registered trademark) format.

If the IC card used is not a FeliCa (registered trademark) card, its IC card identifying information may be in a format different from the FeliCa (registered trademark) format. In such a case, the information format converting unit 175, which may be configured to implement a plugin, converts the format of the IC card identifying information obtained from a non-FeliCa IC card to a FeliCa (registered trademark) card-compatible format.

The communications unit 176 is configured to perform communications with the managing apparatus 11 and the user terminal 15. The executed process history storing unit 177 is configured to record a history of processes performed in the image forming apparatus 17. The executed process history storing unit 177 may be provided within the recording device 173. In the executed process history storing unit 177, history information about processes performed in the image forming apparatus 17 is associated with user identifying information and the type of process, for example, so that a search can be conducted to identify an implemented process based on the user identifying information or the type of process. The result of such a search may be displayed to a user via a display unit mounted on the display/operating device 172.

The executed process history storing unit 177 also stores other information such as a history of execution of the print function; user IDs of users who have used the image forming apparatus 17; a designation of the image forming apparatus 17; the time when a process to be performed was received and the time when a process was completed; and the number of pages of an electronic document or image data processed in the image forming apparatus 17.

The executed process history stored in the executed process history storing unit 177 is periodically uploaded via the communications unit 176 to the management server 11 where it is retained.

In the individual information storing unit 178, individual user information is stored. The individual information may include setting information associated with each user of the image forming apparatus 17; an address book; and image data or an electronic document that is to be or has been processed in the image forming apparatus 17. The individual information is associated with user identifying information and is read when a "Personal Menu" is selected on the image forming apparatus 17, as will be described later. Upon selection of the "Personal Menu" on the image forming apparatus 17 and following the reading of individual information, the control unit 171 executes a process in the image forming apparatus 17 based on the individual information. The individual information storing unit 178 may be provided within the recording device 173.

The password generating unit 179 is configured to generate a password based on the user identifying information and in accordance with a certain algorithm. The password thus generated is stored in the individual information storing unit 178.

In the image forming apparatus 17, an application for realizing each of the functions of the information format converting unit 175, executed process history storing unit 177, individual information storing unit 178, and password generating unit 179 may be recorded in a recording medium that can be attached to and detached from the image forming apparatus 17. In this case, the image forming apparatus 17 is preferably provided with a recording medium reading unit for reading such a recording medium, so that the image forming apparatus 17 can read the application recorded in the recording medium and execute it to realize each of the aforementioned functions. The recording medium may be an SD (Secure Digital) memory card.

Figure 3:
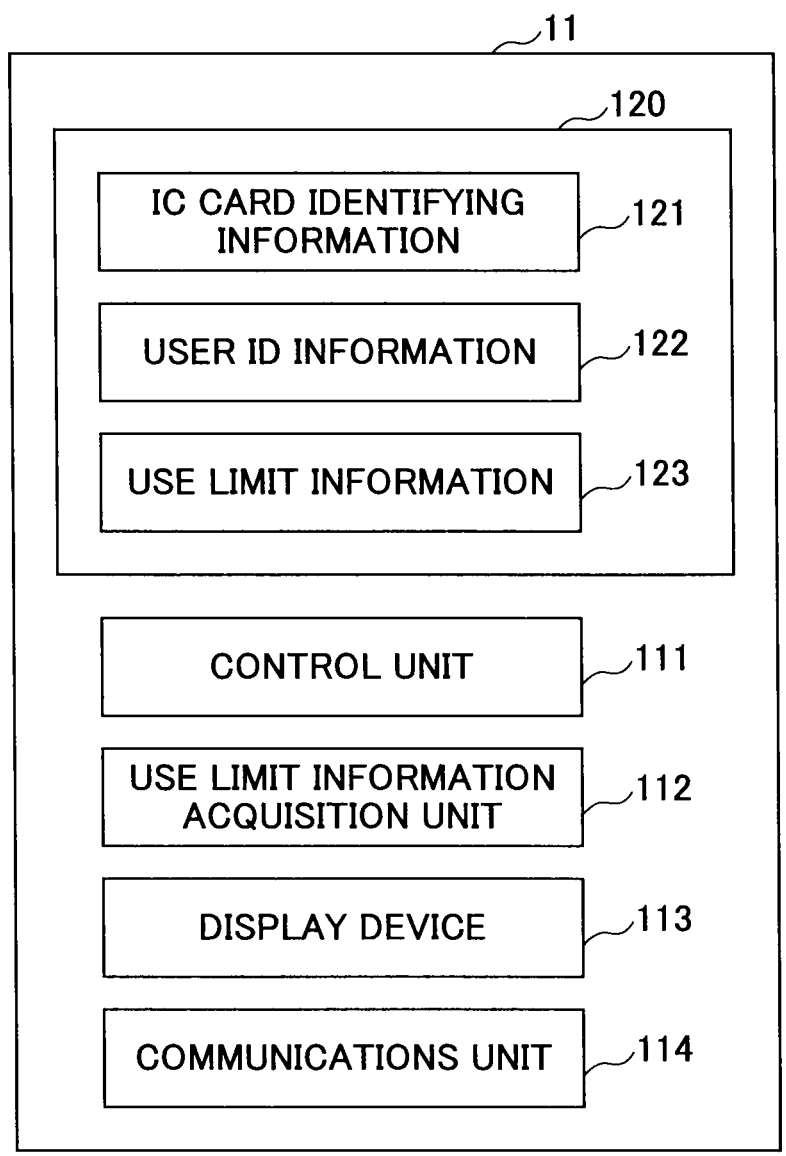
FIG. 3 shows a functional block diagram of a management server in the first embodiment.

FIG. 3 shows a functional block diagram of the management server 11 of the present embodiment. The management server 11 comprises a user information storage device 120, a control unit 111, a use limit information acquiring unit 112, a display device 113, and a communications unit 114.

In the user information storage device 120, user information including IC card identifying information 121, user ID information 122, and use limit information 123 is stored in advance. The IC card identifying information 121 is acquired by the IC card reader 174. The user ID information 122 is associated with the IC card identifying information 121; it is obtained by the control unit 111 based on the IC card identifying information 121. In the present embodiment, the user identifying information refers to the pair of the IC card identifying information 121 and the associated user ID information 122.

The use limit information 123 is associated with the user ID information 122; it indicates one or more functions that a user is allowed to utilize in the image forming apparatus 17 and setting conditions, for example. Specifically, the use limit information indicates which functions of the image forming apparatus 17, such as the scan function, the FAX function, a monochrome print function, and a color print function, a user is allowed to use. For example, in the image forming apparatus 17 of the present embodiment, a user A may be allowed to use the scan function, FAX function, monochrome print function, and color print function, while a user B may be allowed to use only the scan function and the print function, based on the limiting information. Such information stored in the user information storage device 120 may be registered by the administrator of the image forming apparatus management system 10 or a user in advance.

The control unit 111 controls processes performed in the management server 11. The use limit information acquiring unit 112 acquires the use limit information 123 retained in the user information storage device 120. The display device 113 displays information relating to various states of the image forming apparatus management system 10, such as the status of the management server 11 and the status of another device connected to the management server 11. The display device 113 may comprise a liquid crystal panel mounted on the management server 11, or a liquid crystal display connected outside the management server 11 by an appropriate technique. The communications unit 114 is configured to perform communications with the print server 16 and the image forming apparatus 17.

Figure 4:
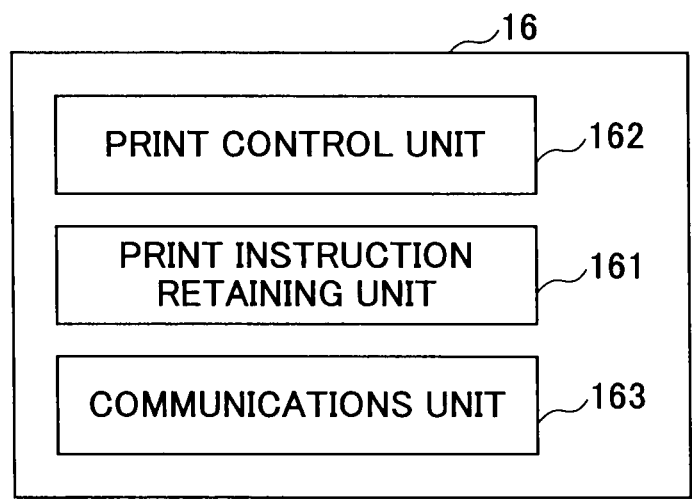
FIG. 4 shows a functional block diagram of a print server in the first embodiment.

FIG. 4 shows a functional block diagram of the print server 16. The print server 16 comprises a print command retaining unit 161, a print control unit 162, and a communications unit 163. The print command retaining unit 161 is configured to temporarily retain a print job which is a print command transmitted from the user terminal 15. In response to a print instruction entered by a user on the user terminal 15 or the image forming apparatus 17, the print control unit 162 transmits a print job retained in the print command retaining unit 161 to the image forming apparatus 17, where the print job is executed. The communications unit 163 is configured to perform communications with the management server 11 and the image forming apparatus 17.

In the print server 16 of the present embodiment, when plural image forming apparatus are connected to the image forming apparatus management system 10, one of the image forming apparatus to which the print job is to be transmitted can be selected. For example, when one of the plural image forming apparatus is performing a separate process, the print control unit 162 can avoid this image forming apparatus and select another image forming apparatus for performing the print job.

A maximum of four such print servers 16 can be connected to a single image forming apparatus. By connecting multiple print servers, more print jobs can be retained. Furthermore, as mentioned above, since the print server of the present embodiment can select an image forming apparatus that is ready to swiftly perform a print job, a print job that is retained can be swiftly performed without increasing the load applied to the image forming apparatus. Further, in case one of multiple print servers should fail, another print server can be operated instead, while allowing the print server that failed to be repaired, maintained, or checked without bringing the entire image forming apparatus management system to a halt.

Figure 5:
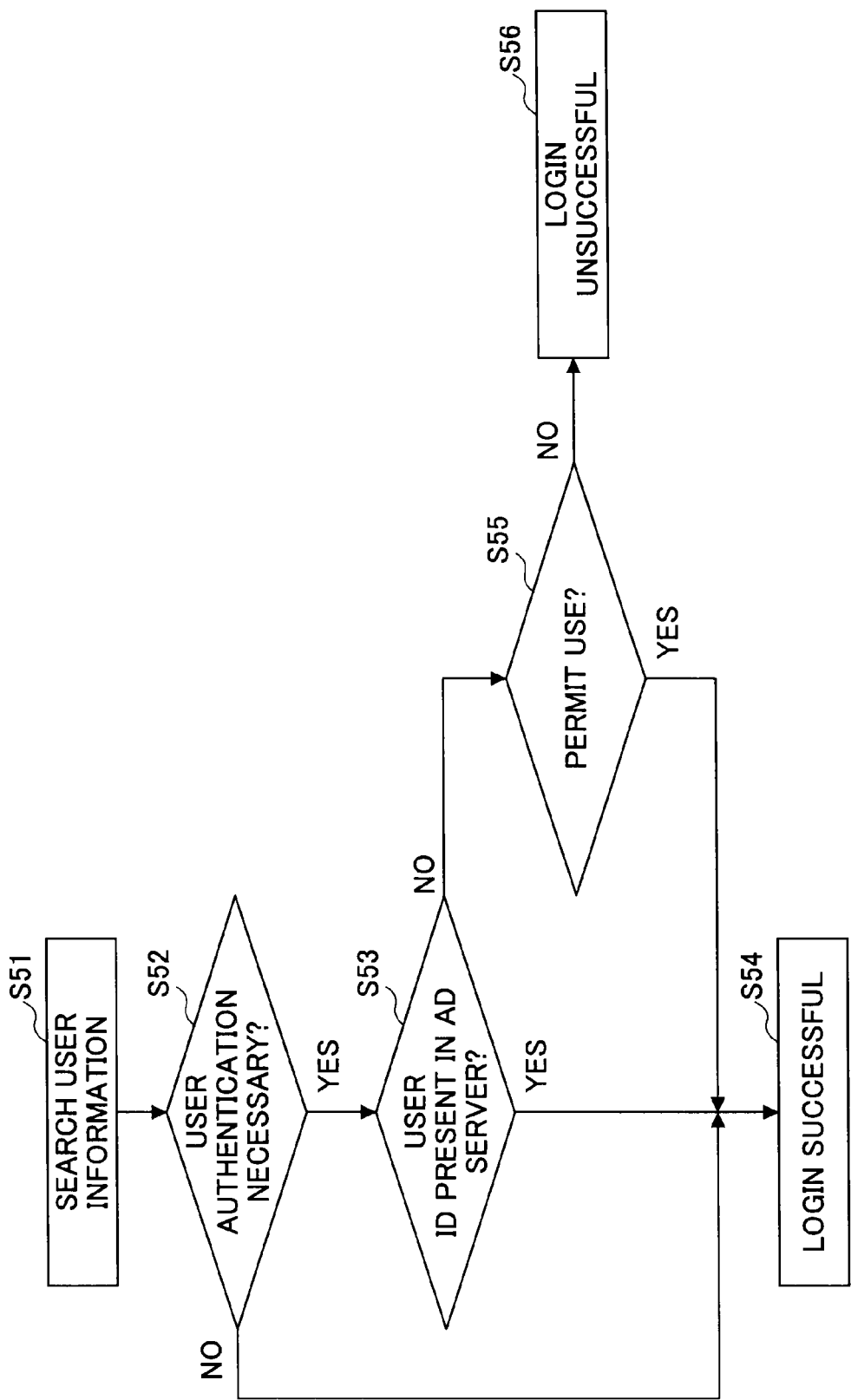
FIG. 5 shows a flowchart of a user authenticating process in the image forming apparatus management system.

With reference to a flowchart shown in FIG. 5, a user authenticating process in the image forming apparatus management system 10 is described.

The image forming apparatus 17 acquires IC card identifying information using the IC card reader 174, and transmits the IC card identifying information to the management server 11 via the communications unit 176. Upon reception of the IC card identifying information by the communications unit 114 in the management server 11, the control unit 111 searches the user information storage device 120 based on the received IC card identifying information, and determines whether corresponding IC card identifying information is retained in the IC card identifying information 121 (S51).

If the received IC card identifying information is found in the IC card identifying information 121, the control unit 111 obtains from the user ID information 122 a user ID that is associated with the acquired IC card identifying information. The control unit 111 then determines whether the management server 11 is set to perform a user authenticating process involving the AD server 13 (S52).

If it is determined in S52 that the setting is for performing a user authenticating process using the AD server 13, the control unit 111 accesses the AD server 13 and determines whether the obtained user ID exists in the user ID information retained in the AD server 13 (S53).

If there is the corresponding user ID in the AD server 13, the control unit 111 successfully authenticates the user (S54). If the management server 11 is not set to perform a user authenticating process using the AD server 13 in S52, the control unit 111 determines that the user has been successfully authenticated in S51 if the corresponding user information is retained in the user information storage device 120.

If the result of determination in S53 concerning the presence of the user ID in the AD server 13 is "NO," the control unit 111 determines whether use of the image forming apparatus 17 should be allowed to the user ID based on the use limit information 123 associated with the relevant user ID (S55). If use is allowed for the user ID, the control unit 111 determines that the user is authenticated. If use is not allowed for the user ID, the control unit 111 determines that the login process has been unsuccessful, and terminates the user authenticating process (S56).

After successful authentication in S54, the control unit 111 in the management server 11 acquires use limit information associated with the authenticated user from the user limit information 123 using the use limit information acquiring unit 112. The control unit 111 then transmits the acquired use limit information to the image forming apparatus 17 using the communications unit 114.

Upon reception of the use limit information, the control unit 171 in the image forming apparatus 17 controls a process in the image forming apparatus 17 so that only a function allowed to the authenticated user can be realized.

Figure 6:
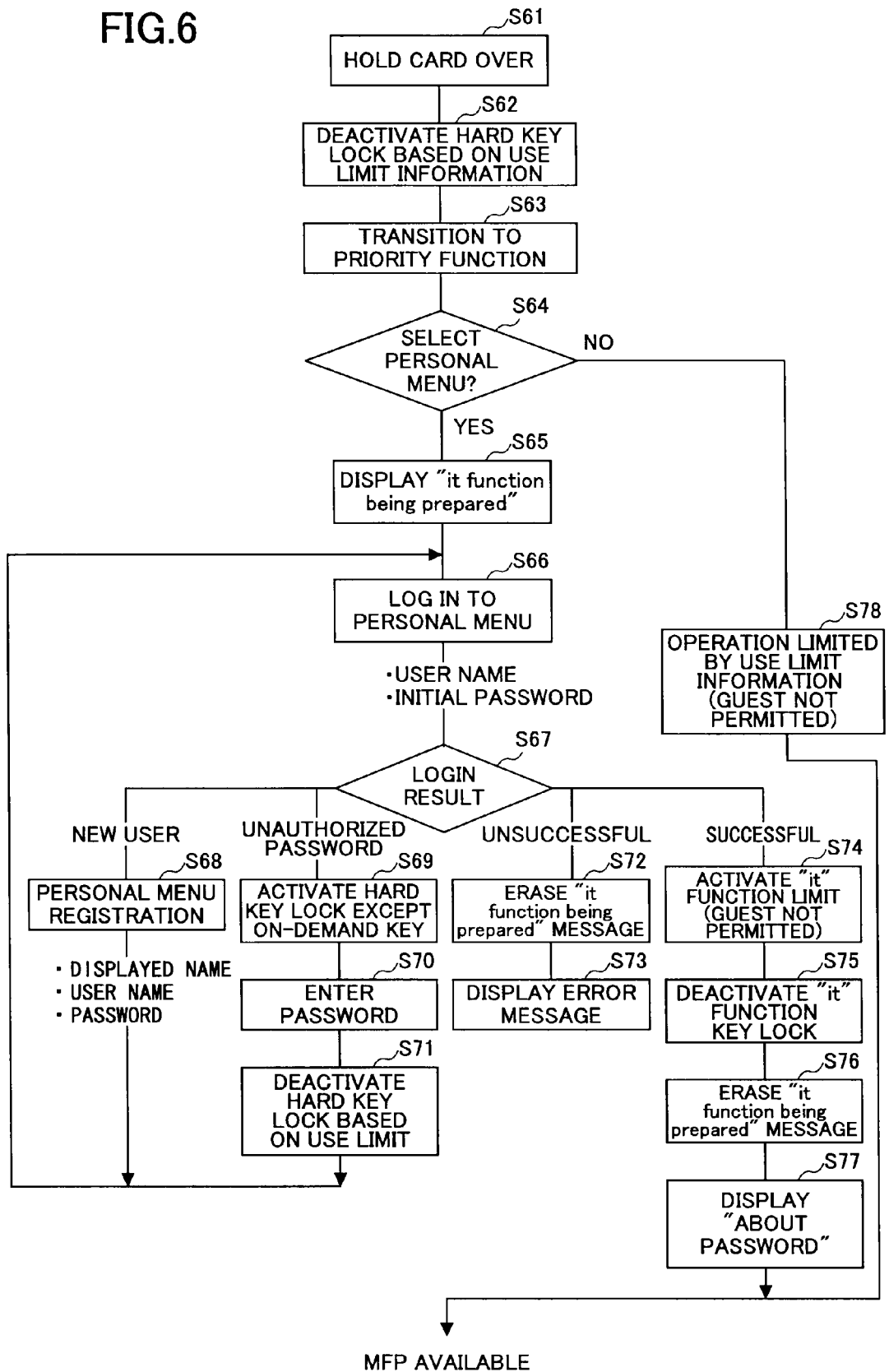
FIG. 6 shows a flowchart of an operation of a "Personal Menu" process in the image forming apparatus in the first embodiment.
Figure 7:
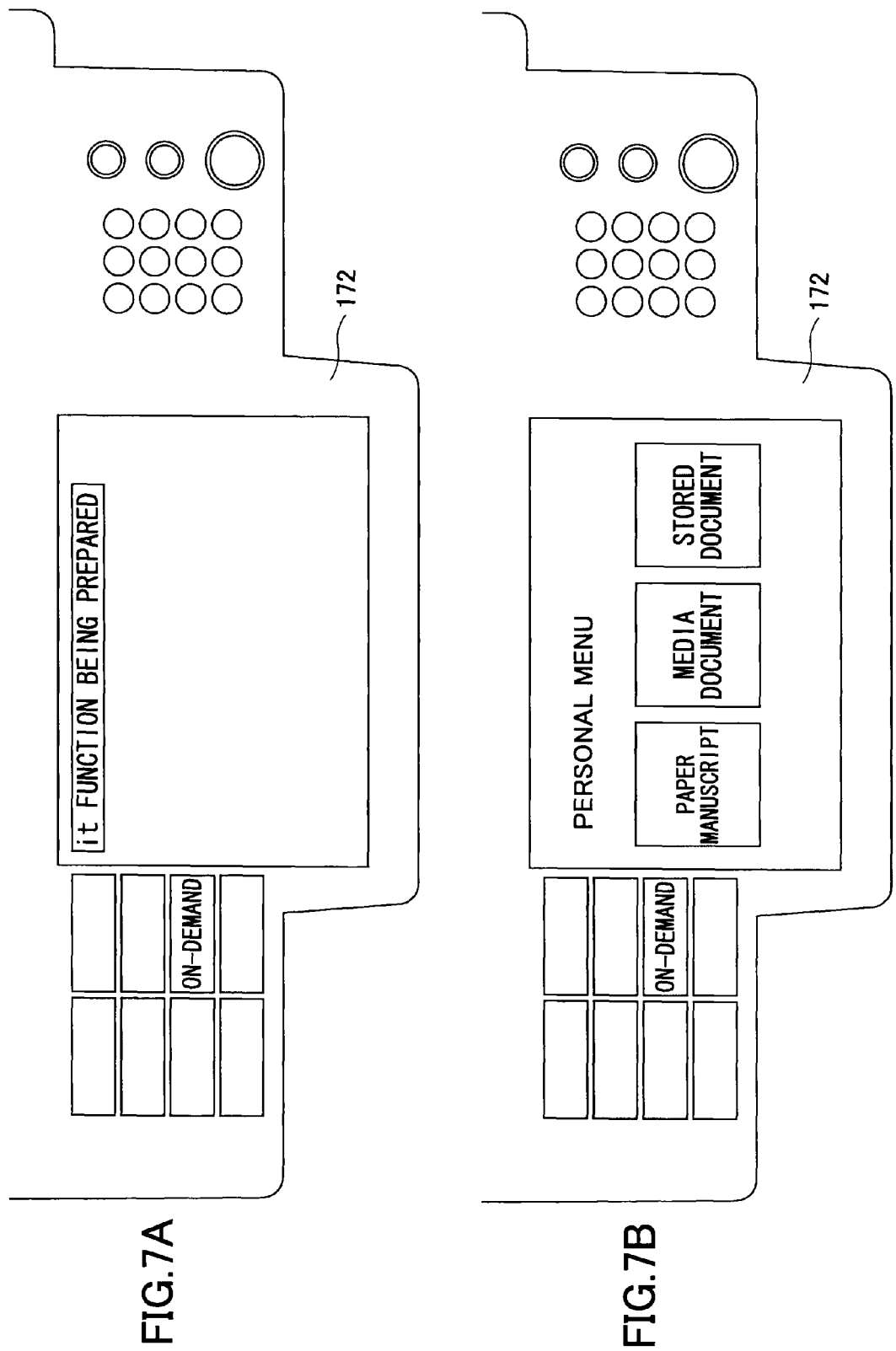
FIG. 7A illustrates a status of the display/operating device upon selection of the "Personal Menu" process.
FIG. 7B illustrates another status of the display/operating device upon selection of the "Personal Menu" process.

With reference to FIGS. 6 and 7, the aforementioned Personal Menu process performed in the image forming apparatus 17 is described. The Personal Menu in the present embodiment refers to a menu of functions that are only allowed to a user whose user ID and password are registered in the image forming apparatus 17 in advance. The functions listed in the Personal Menu include access to image data or electronic documents accumulated for each user in the image forming apparatus 17; viewing of such data; use of an individual user's address book; and viewing of individual user's mail documents. Upon selection of the Personal Menu, an individual user can customize the settings for the display unit of the display/operating device 172 or the image forming apparatus 17. A "Personal Menu process" refers to a process performed by the image forming apparatus 17 upon selection of the Personal Menu.

FIG. 6 shows a flowchart of a Personal Menu process in the image forming apparatus 17 of the present embodiment. FIG. 7A shows a status of the display/operating device 172 prior to login to the Personal Menu. FIG. 7B shows a status of the display/operating device 172 after a login to the Personal Menu.

With reference to FIG. 6, as a user holds his IC card over the IC card reader 174, the user authenticating process described with reference to FIG. 5 is initiated (S61). The image forming apparatus 17 is placed in a status such that it cannot be operated from the display/operating device 172 (to be hereafter referred to as a "hard key lock") until after a successful user authentication.

If user authentication in S61 is successful and the user is one to whom use of the image forming apparatus 17 is allowed, the control unit 171 deactivates the hard key lock state (S62). The control unit 171, based on the use limit information transmitted from the management server 11 concerning the user, transitions the status of the image forming apparatus 17 to a status such that one or more functions allowed to the user can be performed (S63).

If implementation of the Personal Menu process is selected by the user (S64), the control unit 171, as shown in FIG. 7A, causes the display unit of the display/operating device 172 to indicate that Personal Menu has been selected (S65). The "'it' function" indicated in FIGS. 6 and 7 generally refers to functions in the image forming apparatus involving transmission and reception of information directly via a network. In the present embodiment, functions that can be realized by the Personal Menu process are included in the "'it' function."

Then, the control unit 171 of the image forming apparatus 17 performs a process to log in to the Personal Menu (S66). A password is generated in S61 by the password generating unit 179 based on the user ID obtained from the IC card identifying information. In the image forming apparatus 17, a user ID is registered by the user beforehand and a password generated by the password generating unit 179 based on the user ID is retained in advance.

The control unit 171 determines whether the user ID and the password that are retained in advance correspond to the user ID and the password obtained in S61 (S67).

If it is determined in S67 that no corresponding user ID is retained in the image forming apparatus 17, the control unit 171, determining that the user is a new user who is not registered, causes a user registration screen to be displayed on the display/operating device 172 and moves onto a user registration process (S68).

If it is determined in S67 that the password is not authentic, the control unit 171 locks the hard keys other than an "On-Demand" key on the display/operating device 172 (S69). The On-Demand key is one of the operating portions disposed within the display/operating device 172; it is an operating key for entering a print instruction regarding a print job that is already retained within the image forming apparatus 17.

A password may be found unauthentic in the image forming apparatus 17 when the initial password necessary for login to the Personal Menu, which is generated by the password generating unit 179, is changed by the user to a user-defined password. Thus, the control unit 171 causes the display/operating device 172 to display a touch panel screen or the like via which a password can be entered, and indicates that entry of a modified password, if any, is necessary (S70). If the user enters a correct password in S70, the control unit 171 releases the hard key lock status in accordance with the use limit information (S71). The routine then returns to the process of determining whether the user ID registered and retained in the image forming apparatus 17 in advance and the modified password correspond to the user ID acquired in S61 and the password entered in S70, respectively.

If the result of the login process is an error in S67 for one reason or another, the control unit 171 eliminates the message displayed on the display/operating device 172 in S65 indicating the selection of the Personal Menu (S72). The control unit 171 then causes the display/operating device 172 to show a message indicating that the login process to the Personal Menu has resulted in an error (S73).

Thereafter, the control unit 171, based on the use limit information, controls the image forming apparatus 17 so that one or more functions allowed to the user without logging in to the Personal Menu can be realized.

If in S67 the user ID and password retained in the image forming apparatus 17 correspond to the user ID acquired in S61 and the password generated from that user ID, the control unit 171 determines that the user has successfully logged in to the Personal Menu, and acquires the individual information associated with the user ID from the individual information storing unit 178. Then, the control unit 171 limits the setting conditions and the like concerning use of the image forming apparatus 17 based on the individual information (S74).

The control unit 171 then renders usable those operating keys on the display/operating device 172 that are used during the activation of the "Personal Menu" function (S75), and eliminates the message indicating the selection of the Personal Menu that was displayed on the display/operating device 172 in S65 (S76). The control unit 171 then displays a message on the display/operating device 172 indicating that the user is now allowed to view the information about the password generated by the password generating unit 179 (S77). Thus, the login process to the Personal Menu on the image forming apparatus 17 is completed, whereby the Personal Menu for the individual user is displayed on the display/operating device 172, as shown in FIG. 7B.

In the present embodiment, a user name associated with a registered user ID may be registered in the image forming apparatus 17, so that the user name can be displayed on the screen immediately after login of the user is completed.

If in S64 the user does not select implementation of the Personal Menu process, the control unit 171 controls the image forming apparatus 17 based on the use limit information acquired in S61 from the management server 11 (S78). In this way, the user can use the image forming apparatus 17.

The password information that the user can view on the display/operating device 172 in S77 may include the initial password generated by the password generating unit 179 and information about a setting change associated with the changing of the initial password to a user-defined password. In the present embodiment, the screen of the display/operating device 172 in S77 may transition to a setting screen for password change; alternatively, if the user has already changed his password, the screen may transition to a screen on which the user can be notified of the initial password again. Preferably, when notifying the user of his password, the password that is displayed on the display/operating device 172 may be automatically erased after a predetermined duration of time.

Thus, in the first embodiment of the present invention, the user identifying information is managed by the management server, and the functions of the image forming apparatus are limited based on the user identifying information. Thus, security of the user information managed in the image forming apparatus can be ensured and its confidentiality can be maintained.

Furthermore, since the functions of the image forming apparatus are limited on an individual user basis, wasteful implementation of a process can be prevented and a high usability can be achieved. Because a user ID is acquired from a contactless IC card, there is no need for a user to enter his user ID for each login, thereby achieving a high operability. A password is generated from the user ID by the password generating unit, so that the need to carry a password around is eliminated, thus preventing the leakage of a password in case information about user identifying information should be leaked.

In the present embodiment, a change in the format of IC card identifying information due to a change in the type of the IC card can be accommodated.

In accordance with the present embodiment, processes performed in the image forming apparatus are classified and recorded on a user identifying information basis or by the type of process performed, so that the processes performed in the image forming apparatus can be easily monitored.

Furthermore, in the present embodiment, the overall status of the image forming apparatus management system as a whole can be displayed to the user, whereby the operation of the entire system or the status of each connected device can be easily monitored.

Embodiment 2

In the following, a second embodiment of the present invention is described with reference to the drawings, in which functional components similar to those of the first embodiment, of which the second embodiment is an improvement, are designated with similar numerals.

Figure 8:
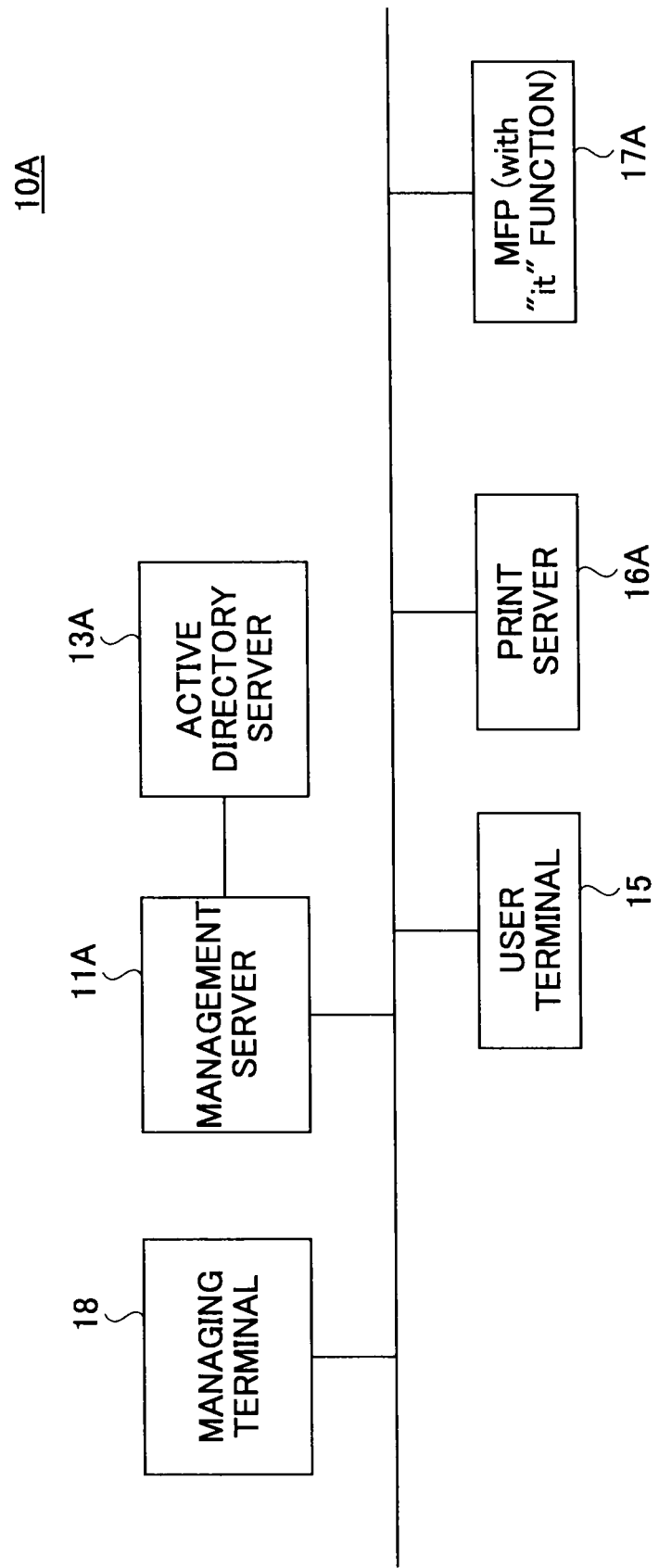
FIG. 8 shows a system configuration of an image forming apparatus management system according to a second embodiment of the present invention.

FIG. 8 shows a system configuration of an image forming apparatus management system 10A according to the second embodiment. The image forming apparatus management system 10A comprises a management server 11A, an AD server 13A, a user terminal 15, a print server 16A, an image forming apparatus (MFP) 17A, and a managing terminal 18 configured to control the management server 11A. These devices are connected via a network.

In the following, each component device of the image forming apparatus management system 10A is described.

Figure 9:
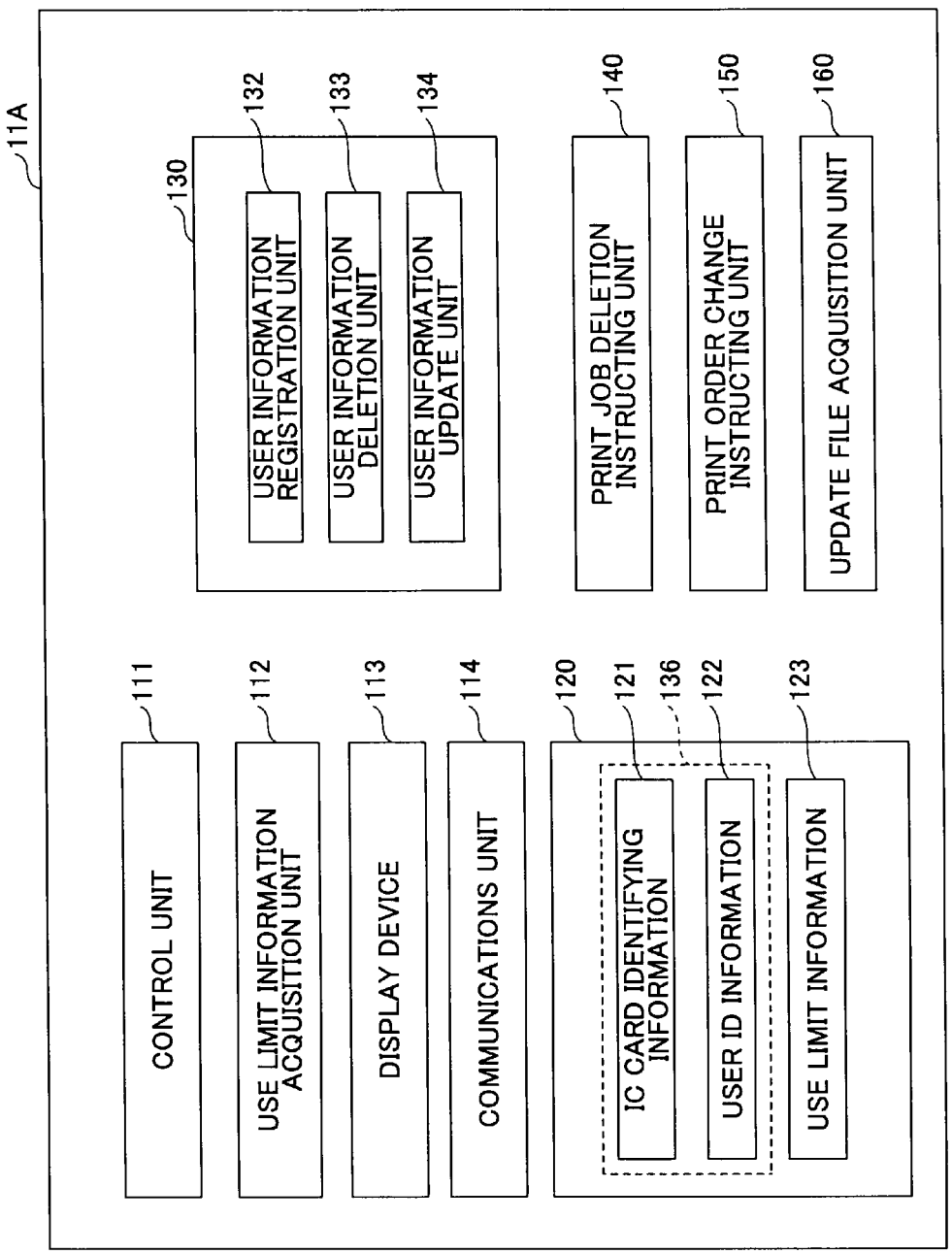
FIG. 9 shows a functional configuration of a management server in the second embodiment.

FIG. 9 shows a functional configuration of the management server 11A.

The management server 11A may be realized by installing a management server program on a conventional computer having a processing unit and a storage unit. The individual portions of the management server 11A that are described below indicate individual functions realized by such a program.

The management server 11A, in addition to the units of the management server 11 of the first embodiment, comprises a user information management unit 130, a print job deletion instructing unit 140, a print order changing unit 150, and a user information update file acquiring unit 160.

The user information management unit 130 comprises a user information registration unit 132, a user information deleting unit 133, and a user information updating unit 134.

The user information registration unit 132 is configured to register user information in the user information storage unit 120. The user information deleting unit 133 is configured to delete user information from the user information storage device 120. The user information updating unit 134 is configured to update the user information stored in the user information storage device 120 based on user information update information, as will be described below.

The print job deletion instructing unit 140 is configured to generate a print job deletion instruction for deleting print jobs accumulated in the print server 16A all at once. The print order change instructing unit 150 is configured to generate an execution order change instruction for changing the order of execution of print jobs accumulated in the print server 16A.

The user information update file acquiring unit 160 is configured to acquire an update file for updating the user information in the user information storage device 120. An update file may be generated by another device connected to the management server 11A via a network. In this case, the management server 11A may acquire the update file by downloading it. Alternatively, an update file may be generated by a computer that is not connected to the management server 11A and then recorded in a conventional recording medium. In this case, the management server 11A may acquire the update file by reading the recording medium.

Figure 10:
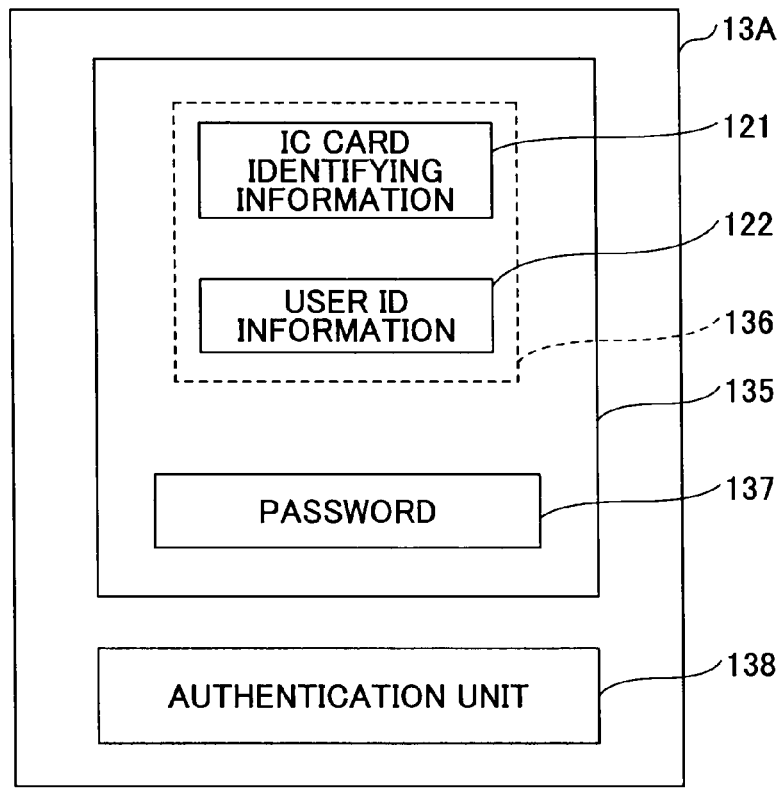
FIG. 10 shows a functional configuration of an AD server in the second embodiment.

With reference to FIG. 10, the AD server 13A of the present embodiment is described. FIG. 10 shows a functional configuration of the AD server 13A.

The AD server 13A comprises an authentication information storing unit 135 and an authenticating process unit 138. The authentication information storing unit 135 stores user identifying information 136 and a password 137. The user identifying information 136 consists of a pair of IC card identifying information 121 and user ID information 122 associated therewith. The password 137 is associated with the user ID information 122. The user identifying information 136 may be registered by a system administrator in advance. The authenticating process unit 138 is configured to authenticate a user by determining whether his user identifying information stored in the authentication information storing unit 135 is valid.

Figure 11:
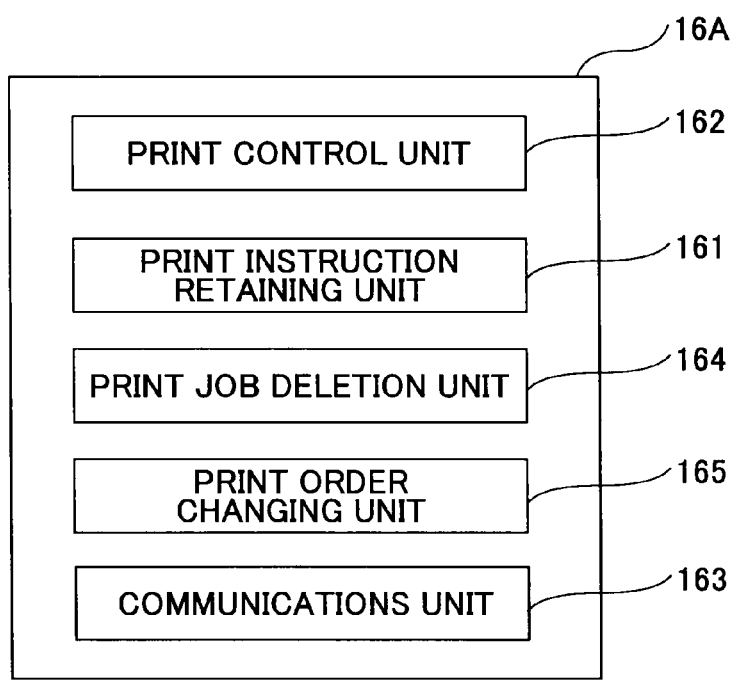
FIG. 11 shows a functional configuration of a print server in the second embodiment.

With reference to FIG. 11, the print server 16A of the present embodiment is described. FIG. 11 shows a functional configuration of the print server 16A.

The print server 16A, in addition to the portions of the print server 16 of the first embodiment, comprises a print job deleting unit 164 and a print order changing unit 165. The print job deleting unit 164 is configured to delete print jobs retained in the print command retaining unit 161 all at once in response to a print job deletion instruction from the management server 11A. The print order changing unit 165 is configured to change the order of execution of print jobs retained in the print command retaining unit 161 in response to a print order change instruction from the management server 11A.

Figure 12:
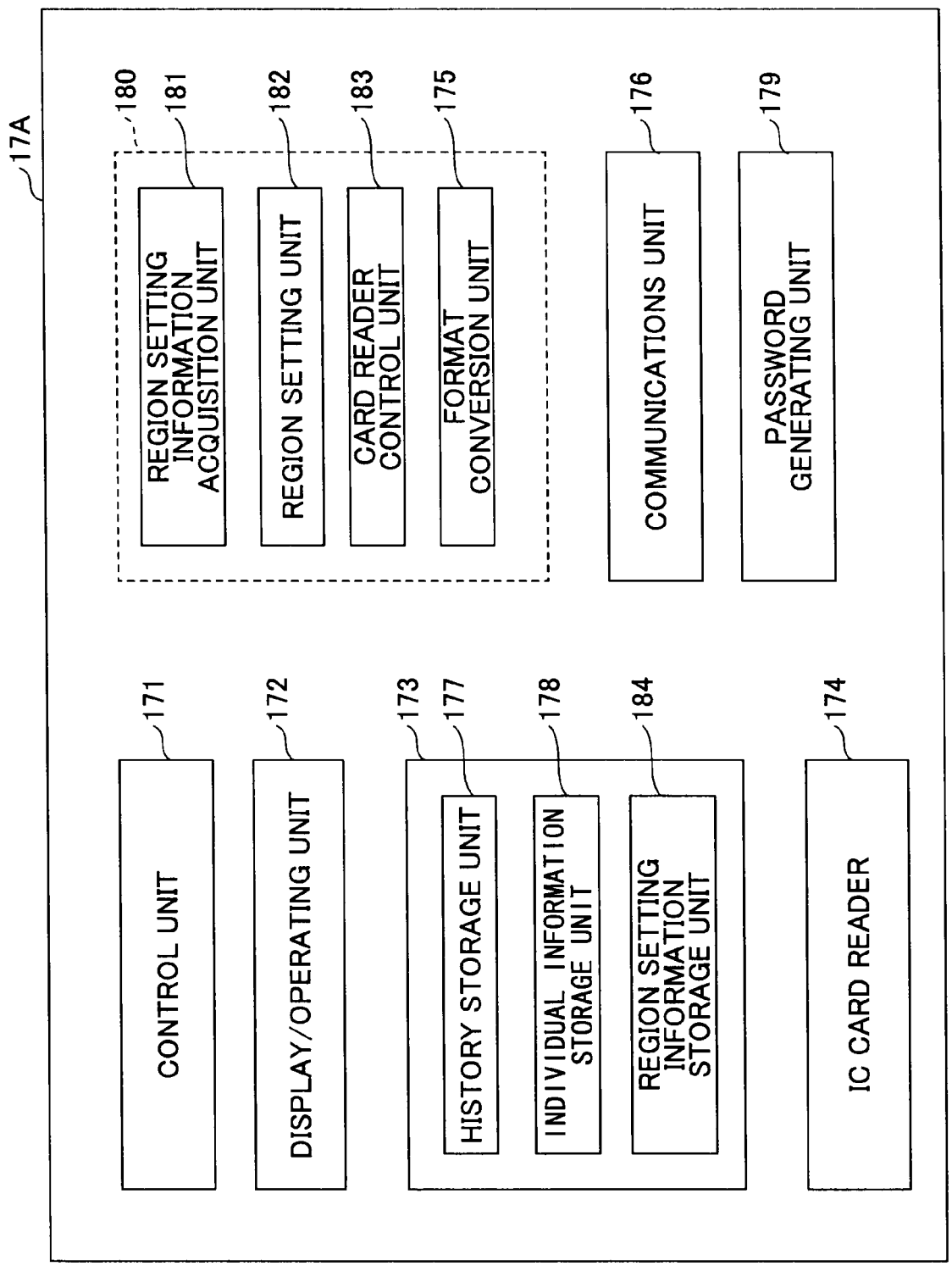
FIG. 12 shows a functional configuration of an image forming apparatus in the second embodiment.

With reference to FIG. 12, the image forming apparatus 17A of the present embodiment is described. FIG. 12 shows a functional configuration of the image forming apparatus 17A.

The image forming apparatus 17A is configured to read information recorded in a region of an IC card. The image forming apparatus 17A comprises a processing unit and a storage device. The functions of the individual units of the image forming apparatus 17A described below are realized by causing the processing unit to execute a program for the image forming apparatus 17A.

The image forming apparatus 17A, in addition to the portions of the image forming apparatus 17 of the first embodiment, comprises a region setting information acquiring unit 181, a region setting unit 182, and a card reader control unit 183.

In the present embodiment, the region setting information acquiring unit 181, the region setting unit 182, the card reader control unit 183, and an information format converting unit 175 of the image forming apparatus 17A constitute a plugin 180. The plugin 180 may be downloaded from a device connected to the image forming apparatus 17A via a network. Alternatively, the plugin 180 may be recorded in a recording medium, such as a USB memory. The image forming apparatus 17A is preferably fitted with a receptacle for a USB memory stick. Thus, in the image forming apparatus 17A, the functions of the plugin 180 may be realized by reading and activating the plugin 180 recorded in such a recording medium.

In the following, the components of the plugin 180 are described. The region setting information acquiring unit 181 is configured to acquire region setting information, which is generated by the managing terminal 18 as will be described below. The region setting unit 182 is configured to make a region setting based on the region setting information acquired by the region setting information acquiring unit 181. Specifically, the region setting unit 182 stores the acquired region setting information in a region setting information storing unit 184 of the recording device 173.

The card reader control unit 183 is configured to control the reading of information by the IC card reader 174. When reading the information from the IC card, the IC card reader 174 refers to the region setting information storing unit 184 so as to read information in a set region.

The information format converting unit 175 performs the same function as in the first embodiment. Namely, it converts the format of the information read from the IC card reader 174 into an information format that can be handled by the forming apparatus management system 10A of the present embodiment.

Thus, the image forming apparatus 17A can handle plural types of IC cards in which information is recorded by different standards. While the image forming apparatus 17A has been described as acquiring the region setting information from the managing terminal 18, this is merely an example. In another example, the region setting information may be recorded in a recording medium in the same way as for the plugin 180, so that the region setting information acquiring unit 181 can acquire the region setting information from the recording medium.

Figure 13:
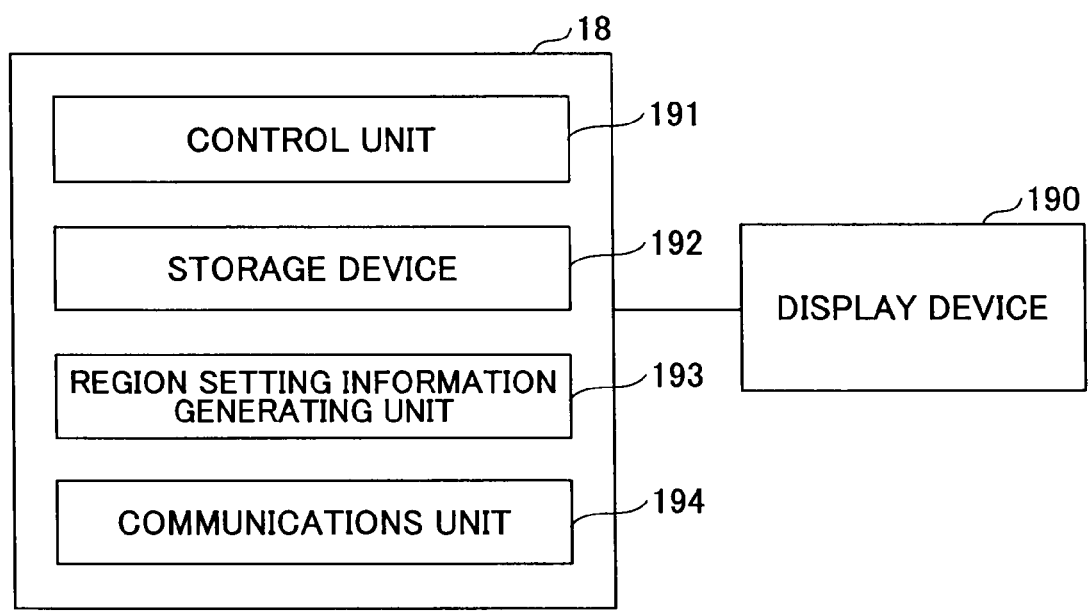
FIG. 13 shows a functional configuration of a managing terminal in the second embodiment.

With reference to FIG. 13, the managing terminal 18 of the present embodiment is described. FIG. 13 shows a functional configuration of the managing terminal 18.

The managing terminal 18 is realized by installing a managing terminal program on a conventional computer having a processing unit and a storage unit. The functions of the individual portions of the managing terminal 18 described below are realized by such a program.

The managing terminal 18 comprises a display device 190, a control unit 191, a storage device 192, a region setting information generating unit 193, and a communications unit 194.

The display device 190, which may comprise a liquid crystal display, is configured to display a result of a process in the managing terminal 18, for example. The control unit 191 controls various processes performed in the managing terminal 18. The storage device 192 stores results of operations performed by the processing unit, setting information regarding the managing terminal 18, etc. The region setting information generating unit 193 is configured to generate region setting information. A process performed by the region setting information generating unit 193 is described with reference to the drawings below. The communications unit 194 is configured to perform communications with various devices connected to the managing terminal 18 via a network.

In the following, a process of generating region setting information in the region information setting unit 193 is described with reference to the drawings.

With reference to FIGS. 14A and 14B, an IC card A is described. FIG. 14A shows an information recording format of the IC card A. FIG. 14B shows information recorded in the IC card A.

In the example shown in FIG. 14A, IC card identifying information is recorded at the top. In block 1, an employee number is recorded. In block 2, the number of times of issuance of the IC card A is recorded. In block 3, the date of issuance of the IC card A is recorded. In block 4, the expiration date of the IC card A is recorded.

The format of the IC card differs from one standard to another and is determined by the issuer of the IC card. Also, the format of the information recorded in the IC card may differ depending on the standard of the IC card. For example, in the case of a FeliCa (registered trademark) card, information is recorded in a FeliCa (registered trademark) format. In the case of an eLWISE (registered trademark of NTT Communications, referring to a contactless IC chip card system) card, information is recorded in an eLWISE card format.

FIG. 14B shows the location of each information region on the IC card A. For example, block 1, i.e., a region in which the employee number is recorded, begins at address 0 and ends at address 9.

In the managing terminal 18, region setting information is generated with reference to such format information about the IC card A shown in FIGS. 14A and 14B. The format information about the IC card A may be supplied by the IC card issuer.

The region setting information generating unit 193 of the managing terminal 18 is a function realized by a region setting program. In the managing terminal 18, as a user operating the managing terminal 18 enters an instruction for generating region setting information, the region setting program is activated.

Figure 15:
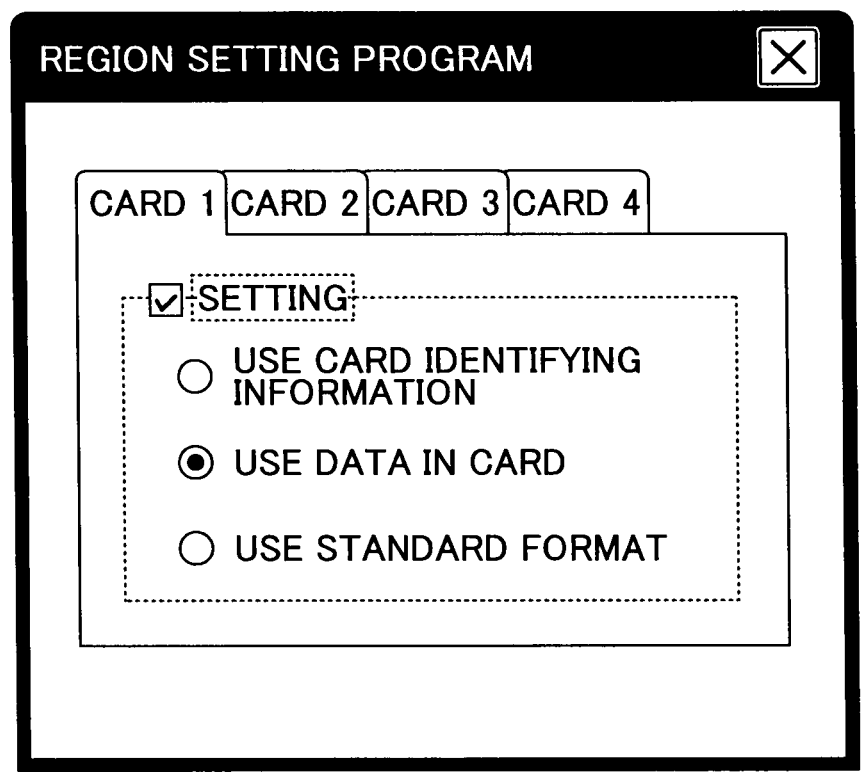
FIG. 15 shows an example of a setting screen for setting the type of a region from which information is to be read.

The region setting program is configured to set a region of the IC card A from which information is to be read. The region setting program causes the display device 190 of the managing terminal 18 to display a screen for setting the region from which information is to be read. FIG. 15 shows an example of such setting screen, where the type of region from which information is to be read can be set. In accordance with the region setting program of the present embodiment, the types of region from which information is to be read from the IC card A include, as shown in FIG. 15, a card identifying information recorded region, an arbitrary region in the IC card A, and a region in accordance with a standard format.

Further, in accordance with the present embodiment, four region setting information patterns can be set for each type (i.e., type of standard) of IC card.

On the setting screen shown in FIG. 15, if the IC card identifying information is selected for the information reading region, the region setting program sets the top region of the IC card A as the information reading region. The region in which the IC card identifying information is recorded may be preset by a system administrator. In accordance with the region setting program of the present embodiment, when the IC card identifying information is selected as the information reading region, the region in which the IC card identifying information is recorded is determined to be the information reading region, based on a setting made by the system administrator.

If on the setting screen shown in FIG. 15 a region in accordance with a standard format is selected as the information reading region, the region setting program sets the region in accordance with the standard format as the information reading region. The standard format is supplied by the issuer of the IC card A to the system administrator in advance and set in the managing terminal 18. Specifically, when the standard format is followed, format information, such as information indicating the region in which the IC card identifying information is recorded, and information indicating a region in which an employee number is recorded, and so on, is stored in the managing terminal 18. Based on such format information stored in the managing terminal 18, the region setting program sets an information reading region.

In the following, a case is described where an arbitrary region in the IC card A is selected on the setting screen of FIG. 15 as the type of information reading region of the IC card A.

Figure 16:
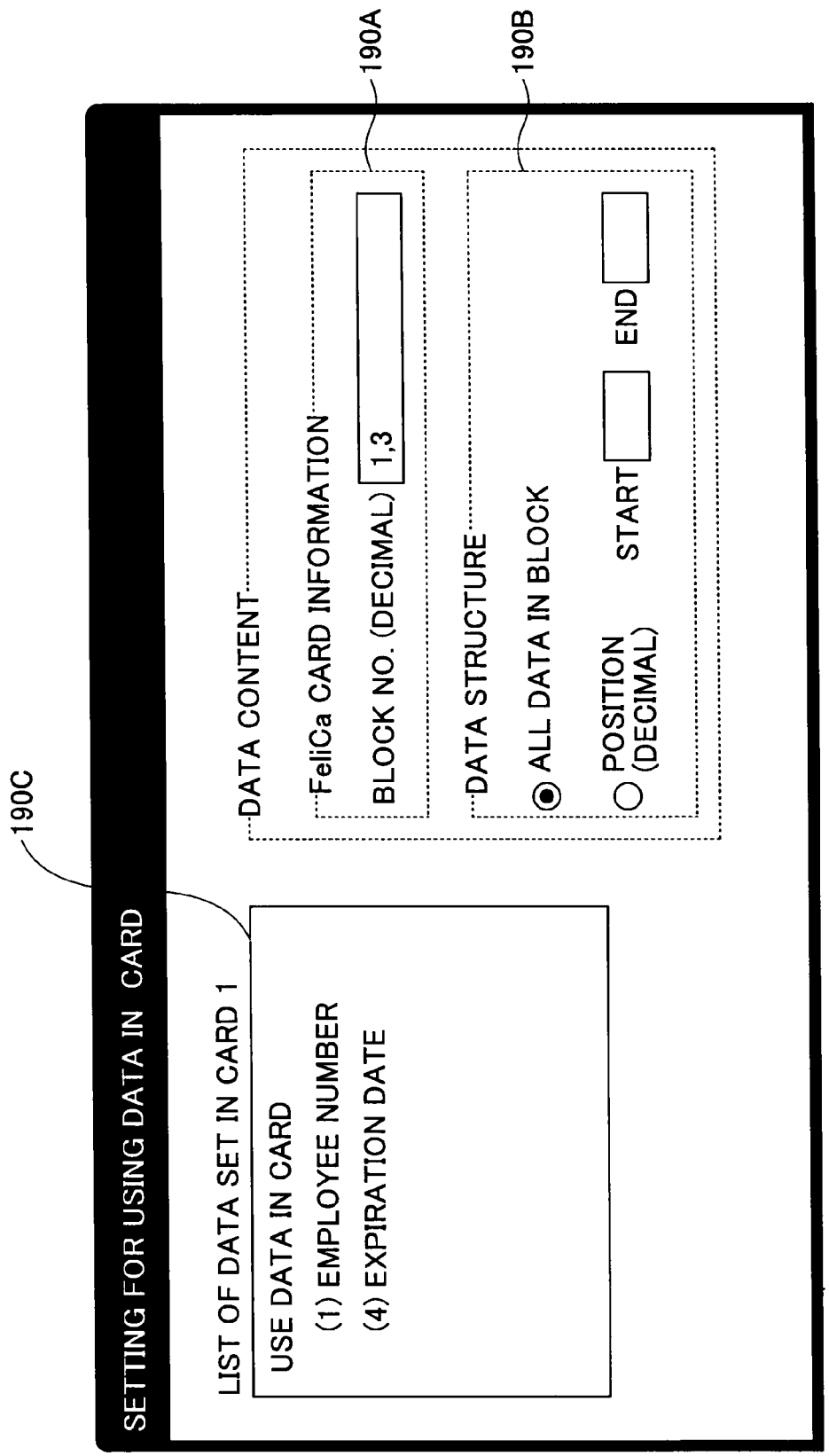
FIG. 16 shows an example of a region setting information generating screen for generating region setting information concerning the IC card.

FIG. 16 shows a screen for generating region setting information for reading information recorded in the IC card A.

The region setting information generating screen includes a block designating portion 190A for designating a block from which information is to be read; a position designating portion 190B for designating a position within a designated block; and an information list portion 190C for showing a list of information items to be read. In the example of FIG. 16, block 1 and block 3 on the IC card A are designated in the block designating portion 190A. In the position designating portion 190B, all of the data in block 1 and block 3 are designated. Therefore, in the present embodiment, region setting information is generated that indicates that all of the data in blocks 1 and 3 on the IC card is to be acquired.

The information list portion 190C shows, as the information items acquired in accordance with the region setting information, an employee number which is the sole data recorded in block 1, and an expiration date which is the sole data recorded in block 3. Thus, in accordance with the region setting program of the present embodiment, blocks and the position of information in the blocks can be designated while monitoring the information items to be read on the region setting information generating screen. Thus, region setting information can be easily generated by, for example, a system administrator through a simple operation.

The region setting information generated by the managing terminal 18 is supplied to the image forming apparatus 17A via a network, for example. Alternatively, the region setting information may be recorded in a recording medium at the managing terminal 18, such as a USB memory. The region setting information recorded in such a recording medium is read and acquired by the image forming apparatus 17A. While the region setting program has been described as being installed on the managing terminal 18, this is merely an example; the region setting program may be installed on the user terminal 15. Alternatively, the region setting program may be installed on a conventional computer that is not connected to the image forming apparatus 17A, and generated region setting information may be recorded on a recording medium that is supplied to the image forming apparatus 17A.

Figure 17:
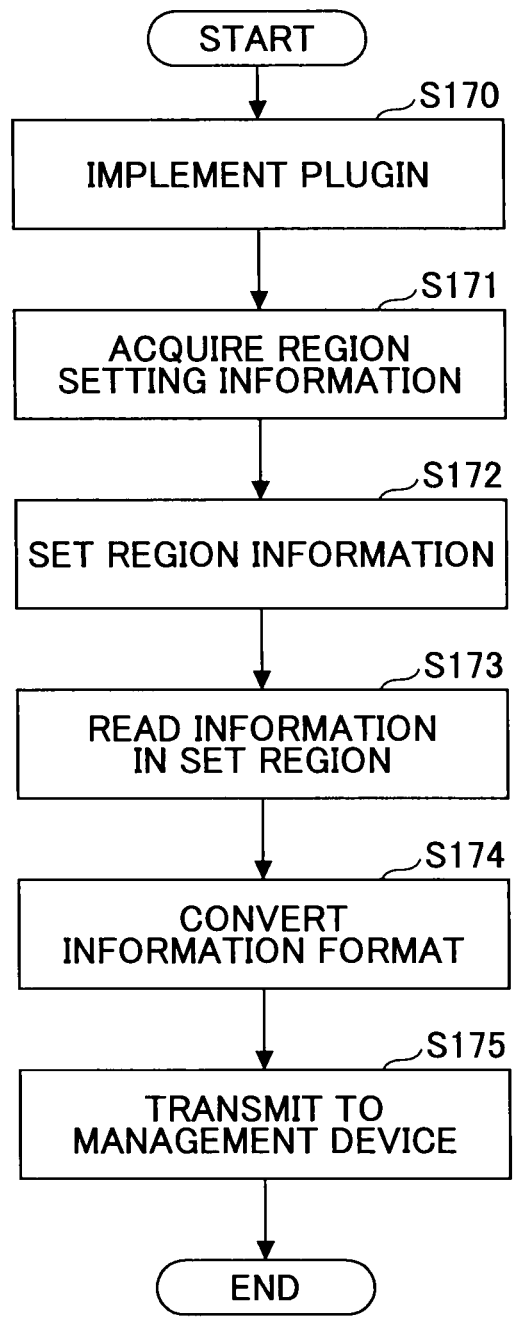
FIG. 17 shows a flowchart of an operation of a plugin in the image forming apparatus.

In the following, an operation of the plugin 180 in the image forming apparatus 17A of the present embodiment is described. In the image forming apparatus 17A, information based on region setting information can be read from the IC card by an operation of the plugin 180. FIG. 17 shows a flowchart of an operation of the plugin 180 in the image forming apparatus 17A.

Upon being selected as an implemented plugin in step S170, the plugin 180 starts a process. In the following, the selection of the plugin is described.

Other than the plugin 180, the image forming apparatus 17A comprises plural types of plugins for controlling the reading of information from the IC card. The system administrator can select one of such plugins that is implemented in the image forming apparatus 17A. The selection of a plugin may be performed using an administrator tool for managing the image forming apparatus management system 10A. The administrator tool may be provided in the managing terminal 18 or in the image forming apparatus 17A.

Examples of the other plugins that the image forming apparatus 17A may comprise include an SSFC plugin based on an SSFC (registered trademark of Shared Security Formats Cooperation, an alliance of corporations for achieving a higher level of office security using IC cards) standard, and an eLWISE plugin based on an eLWISE card standard. For example, if an SSFC (registered trademark) plugin is selected, the SSFC (registered trademark) plugin is implemented, whereby the image forming apparatus 17A reads information from the IC card in accordance with the SSFC (registered trademark) standard format. The plugin 180 of the present embodiment may comprise a FeliCa (registered trademark) plugin in accordance with a FeliCa (registered trademark) standard.

Figure 18:
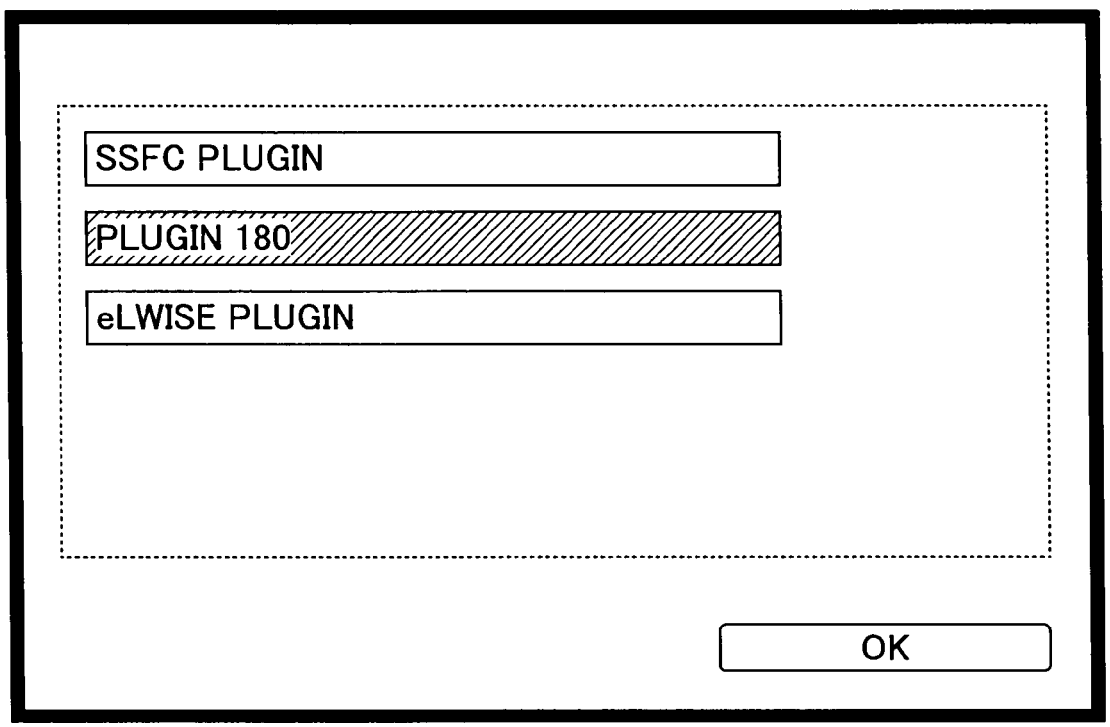
FIG. 18 shows an example of a plugin selection screen.

FIG. 18 shows an example of a plugin selection screen. This selection screen may be displayed on a display device mounted on the managing terminal 18 by which the management server 11A is controlled, or on the display/operating device 172 of the image forming apparatus 17A. Upon selection of the plugin 180 on the selection screen shown in FIG. 18, the image forming apparatus 17A of the present embodiment implements the plugin 180, taking the selection instruction as an implementation instruction.

Following the implementation of the plugin 180 in the image forming apparatus 17A in step S170, the region setting information acquiring unit 181 acquires the region setting information in step S171. The region setting information may be acquired from the managing terminal 18 via a network, or from a recording medium. Thereafter, in step S172, the region setting unit 182 sets the acquired region setting information in the image forming apparatus 17A. Specifically, the region setting unit 182 stores the selected region setting information in the region setting information storing unit 184. This completes the setting of the region setting information in the image forming apparatus 17A.

In step S173, as the IC card A is held over the IC card reader 174, the IC card reader 174 reads the information recorded in the set region of the IC card A under the control of the card reader control unit 183. The card reader control unit 183, with reference to the region setting information stored in the region setting information storing unit 184, controls the reading of the information from the IC card reader 174. The IC card reader 174 may be configured to acquire the IC card format information when the IC card A is held over it.

In accordance with the region setting program of the present embodiment, four region setting information patterns can be generated for each type of IC card. Thus, in the image forming apparatus 17A, plural patterns of region setting information may be acquired and set. If plural patterns of region setting information are set in the image forming apparatus 17A, the card reader control unit 183 determines, successively from the initially acquired region setting information, whether each region setting information pattern corresponds to the format of the IC card A. The card reader control unit 183 then controls the reading of information by the IC card reader 174 based on the region setting information that has been determined as corresponding to the format of the IC card.

In step S174, the information read by the IC card reader 174 is converted by the information format converting unit 175 into a predetermined information format. The "predetermined format" herein refers to the information format handled by the image forming apparatus management system 10A; i.e., an information format that can be processed by the image forming apparatus 17A. For example, when the image forming apparatus 17A is adapted to information in the FeliCa (registered trademark) card format and if the information read by the IC card reader 174 is in the eLWISE (registered trademark) card format, the information format converting unit 175 converts the format of the information read into the FeliCa (registered trademark) card format. If the information read by the IC card reader 174 is in a format that the image forming apparatus 17A can process, the information format converting unit 175 does not need to perform the information format converting process.

In step S175, the image forming apparatus 17A transmits the acquired information, whose format may have been converted by the information format converting unit 175, to the management server 11A. The management server 11A then performs a user login process based on the information transmitted from the image forming apparatus 17A.

Thus, in accordance with the image forming apparatus 17A of the present embodiment, an information reading region is set in the IC card, and the information recorded in the thus set region can be read. Therefore, in the image forming apparatus 17A, the information that is read from the IC card can be set in accordance with the environment in which the image forming apparatus management system 10A is used. Furthermore, in accordance with the image forming apparatus 17A, the format of the information that is read can be converted into a format that the image forming apparatus 17A can process. Thus, the image forming apparatus 17A can be adapted to plural types of IC card readers based on different standards. In this way, the image forming apparatus 17A can be made more versatile.

In the following, a login process according to the present embodiment is described. In accordance with the image forming apparatus management system 10A, a user can log in by entering his user ID information and password, even if he does not carry his IC card with him.

Figure 19:
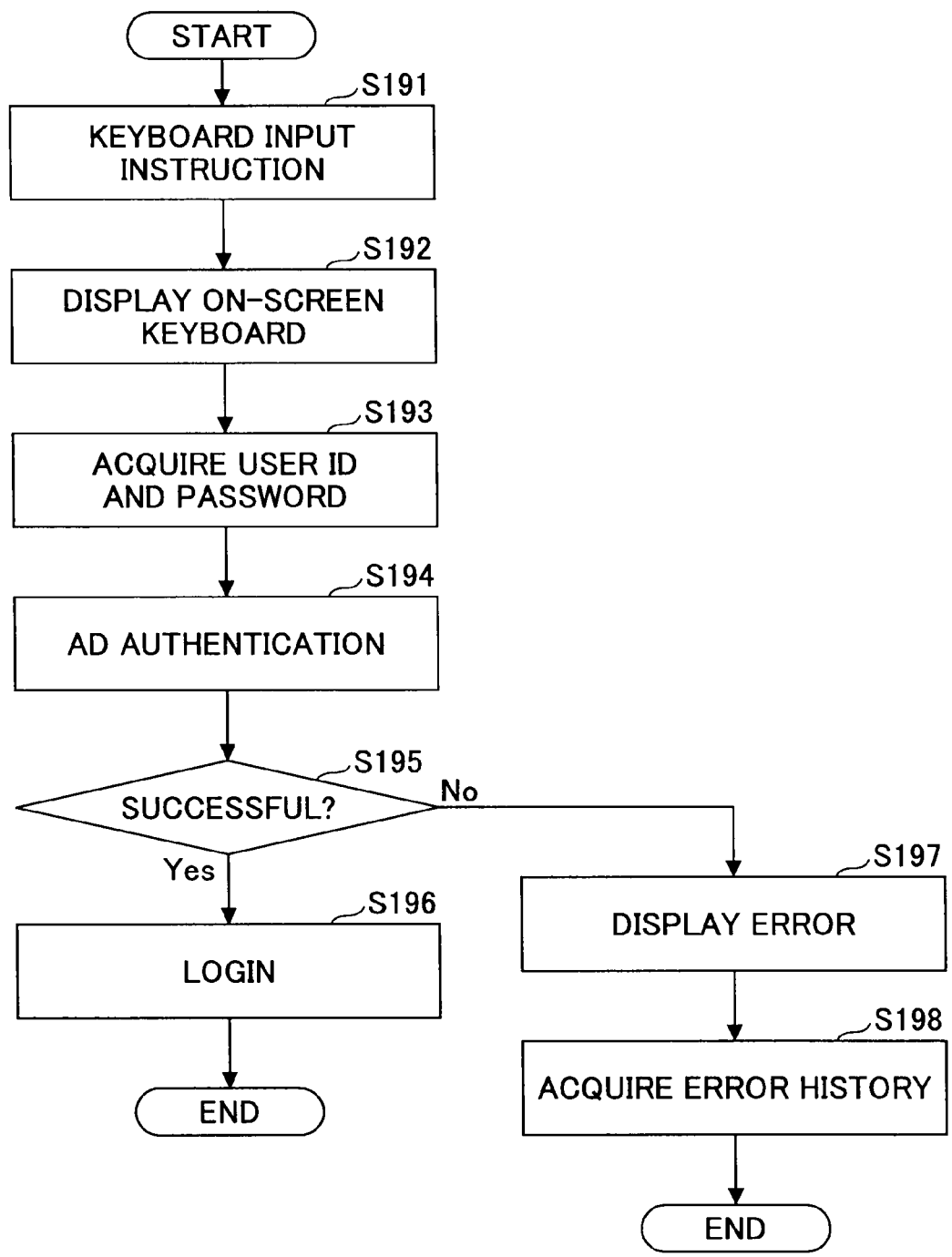
FIG. 19 shows a flowchart of a login process in the second embodiment.

FIG. 19 shows a flowchart of the login process.

Figure 20:
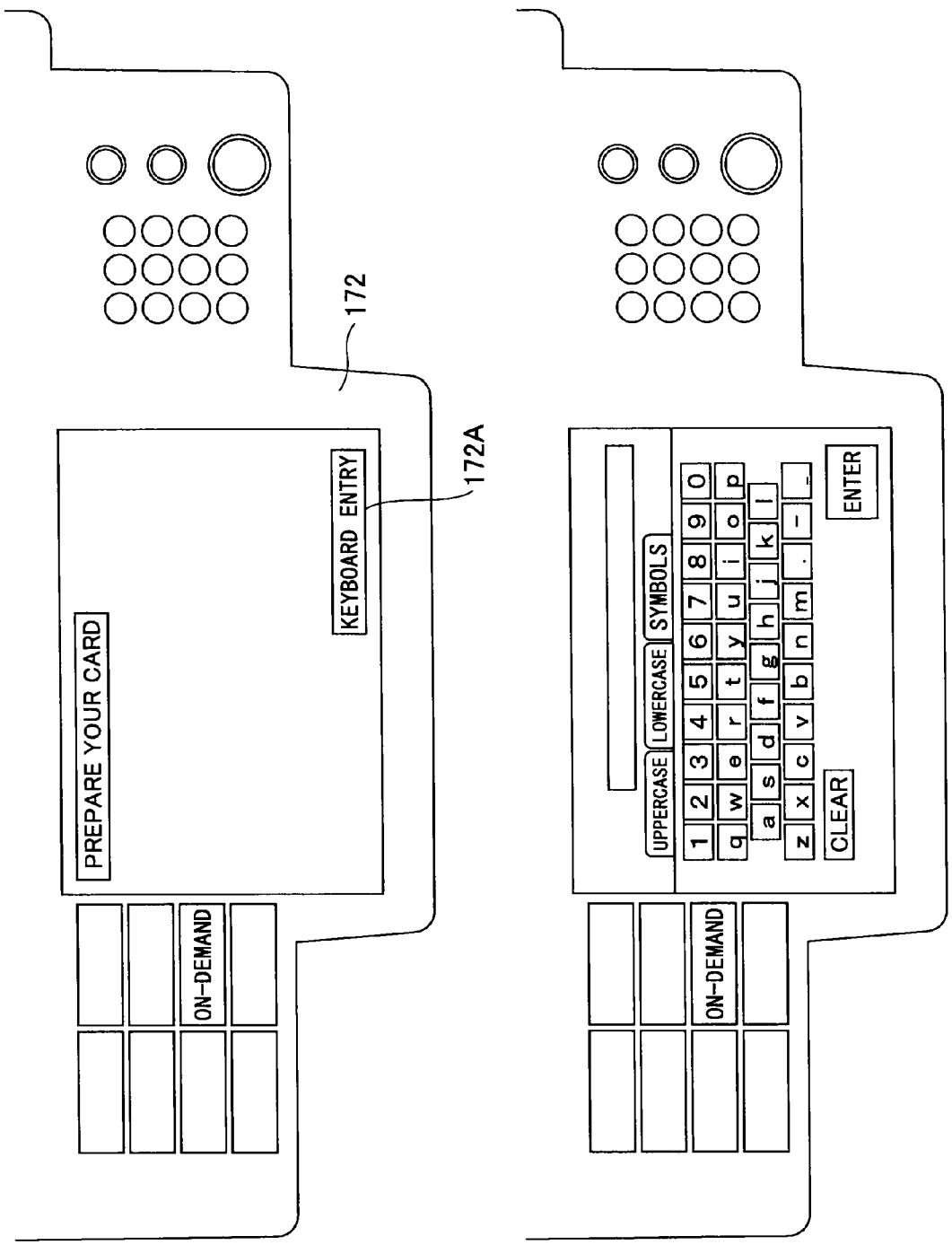
FIG. 20A shows an example of a display screen in the image forming apparatus of the second embodiment.
FIG. 20B shows an on-screen keyboard displayed on a display screen in the image forming apparatus of the second embodiment.

On a standby screen displayed on the display/operating device 172 of the image forming apparatus 17A prior to a login process, an instruction button 172A for instructing the display of a keyboard screen is provided, as shown in FIG. 20A.

FIGS. 20A and 20B show an example of the display screen on the image forming apparatus 17A of the second embodiment. FIG. 20A shows a standby screen displayed on the display/operating device 172. FIG. 20B shows a keyboard screen displayed on the display/operating device 172. As shown in FIG. 20A, a keyboard input indicating button 172A is provided on the standby screen.

Upon entry of a keyboard input instruction via the keyboard input indicating button 172A in step S191, the keyboard screen of FIG. 20B is displayed on the display/operating device 172 in step S192.

Then, in step S193, the image forming apparatus 17A acquires the user ID information and password entered via the keyboard screen. In step S194, the acquired user ID information and password are subjected to an authenticating process in the AD server 13A. Specifically, the image forming apparatus 17A transmits the acquired user ID information and password to the AD server 13A via the management server 11A. In the AD server 13A, it is determined, using the information stored in the authentication information storing unit 135 and with the authenticating process unit 138, whether the acquired user ID information and password are valid. If the acquired user ID information and password are determined to be valid, the AD server 13A authenticates the user.

Following the successful authentication of the user in step S195, the management server 11A allows the user to log in in step S196, and the login process ends.

If the user is not authenticated in step S195, the routine proceeds to step S197, where an authentication error message is displayed on the display/operating device 172 of the image forming apparatus 17A. This is followed by step S198 where the image forming apparatus 17A acquires history information about the authentication error, and stores the information in the execution history information storing unit 177. Alternatively, the authentication error history information may be stored in the management server 11A.

Thus, in accordance with the image forming apparatus 17A of the present embodiment, a login process can be performed even if the user does not carry his IC card by entering his user ID information and password via a keyboard. Thus, in the present embodiment, a user can be allowed to use the image forming apparatus 17A even if he does not carry his IC card, based on the user's use limit information and without having to have a temporary IC card or the like issued.

In the image forming apparatus management system 10A of the present embodiment, up to four AD servers 13A can be installed. Thus, should one of the AD servers 13A fail, another AD server 13A can back up. In the present embodiment, whether or not the instruction button 172A is displayed on the display/operating device 172 of the image forming apparatus 17A may be set by the system administrator in advance. In the image forming apparatus management system 10A, if the setting is such that the instruction button 172A is displayed, the AD server 13A authenticates the user identifying information entered via the keyboard screen.

In the following, management of user information in the management server 11A of the present embodiment is described.

In the management server 11A, user information stored in the user information storage device 120 can be registered, deleted, or updated.

Figure 21:
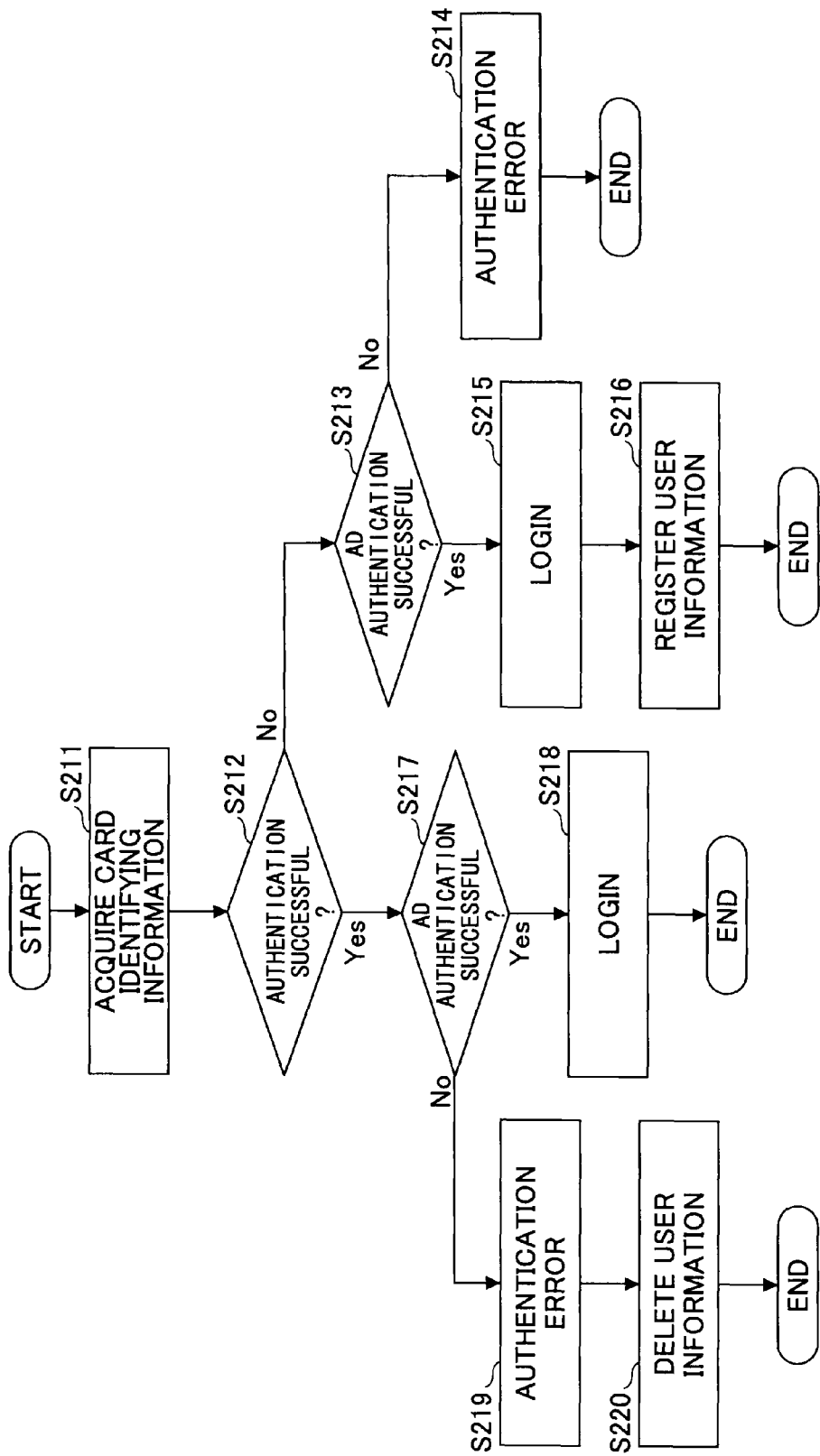
FIG. 21 shows a flowchart of a user information registration/deletion process in the management server of the second embodiment.

FIG. 21 shows a flowchart illustrating the registration and deletion of user information in the management server 11A.

After the IC card reader 174 in the image forming apparatus 17A reads the IC card identifying information 121, the management server 11A acquires the IC card identifying information from the image forming apparatus 17A in step S211.

In step S212, the management server 11A, based on the acquired IC card identifying information 121 and the user information stored in the user information storage device 120, performs an authenticating process on the acquired IC card identifying information 121. In S212, if the authentication of the IC card identifying information 121 fails, the management server 11A transmits the IC card identifying information to the AD server 13A. In step S213, the authenticating process unit 138 of the AD server 13A, based on the acquired IC card identifying information and user identifying information 135, performs an authenticating process on the acquired IC card identifying information 121.

If the authentication of the IC card identifying information 121 acquired by the AD server 13A in step S213 fails, the AD server 13A transmits an authentication error message to the image forming apparatus 17A via the management server 11A. In step S214, the authentication error message is displayed on the display/operating device 172 of the image forming apparatus 17A.

If the IC card identifying information 121 acquired by the AD server 13A is authenticated in step S213, the management server 11A receives a message from the AD server 13A that the user has been authenticated. In response to such message, the management server 11A allows the user to log in in step S215.

In step S216, the management server 11A registers, using the user information registration unit 132, the user identifying information 136 associated with the IC card identifying information 121 authenticated by the AD server 13A, in the user information storing unit 120.

Specifically, the user information registration unit 132, in response to the message that the IC card identifying information 121 has been authenticated by the AD server 13A, acquires from the AD server 13A the user ID information 122 associated with the authenticated IC card identifying information 121. The user information registration unit 132 then registers the IC card identifying information 121 and the user ID information 122 (i.e., the user identifying information 136) in the user information storage device 120, in association with use limit information. The use limit information with which the user identifying information 136 is associated is stored in the user information storage device 120 in advance as an initial setting. In the present embodiment, if the use limit information is in an initial setting status, all of the functions of the image forming apparatus 17A can be used.

Thus, in the present embodiment, if the IC card identifying information 121 is not authenticated in the management server 11A but is authenticated in the AD server 13A, the user is considered to have been authenticated. The management server 11A then acquires from the AD server 13A the user ID information 122 associated with the IC card identifying information 121, and registers it in the user information storage device 120 of the management server 11A in association with the use limit information as an initial setting.

Thus, a system administrator, when registering information about a new user of the image forming apparatus management system 10A, need only register the user identifying information 136 in the AD server 13A alone. Therefore, in the image forming apparatus management system 10A, there is no need to register the user identifying information in both the AD server 13A and the management server 11A, so that the burden on the system administrator can be reduced.

If the IC card identifying information 121 is authenticated by the management server 11A in step S212, the management server 11A transmits the user identifying information 136, which consists of the IC card identifying information 121 and the user ID information 122, to the AD server 13A. In step S217, the AD server 13A performs an authenticating process concerning the user identifying information 136. If the AD server 13A authenticates the user identifying information 136, the management server 11A allows the user to log in in step S218.

If the AD server 13A does not authenticate the user identifying information 136 in step S217, the management server 11A, considering the IC card identifying information 121 to be invalid, transmits an authentication error message to the image forming apparatus 17A in step S219. In step S220, the user information deleting unit 133 in the server 11A deletes from the user information storage device 120 the IC card identifying information 121 that has not been authenticated by the AD server 13A, the associated user ID information 122, and the use limit information.

Thus, in the present embodiment, any invalid user information stored in the management server 11A can be automatically deleted.

Furthermore, in accordance with the present embodiment, an updating process including the above-described registration and deletion of user information can be performed by the user information updating unit 134.

The process for registration or deletion of user information described with reference to FIG. 21 is performed only upon acquisition of the IC card identifying information concerning a user who is subjected to the registration or deletion process. In contrast, the user information updating unit 134 is configured to update the user information stored in the user information storage device 120 periodically.

The management server 11A periodically acquires a prepared update file for updating user information, using the update file acquiring unit 160. Upon acquisition, the user information updating unit 134 rewrites the user information stored in the user information storage device 120 based on the update file.

The update file is described below.

An update file mainly contains information about IC card identifying information and user ID information. The information in the update file corresponds to the user identifying information 136 stored in the AD server 13A. The AD server 13A periodically writes out the user identifying information 136 stored therein as a file in a predetermined format and supplies it to the management server 11A. The "predetermined format" refers to a format that can be processed by the management server 11A, such as the CSV file format.

The management server 11A acquires such an update file AD periodically supplied from the AD server 13A and updates the user information based on the update file. In this way, the management server 11A can make the user information in the user information storage device 120 correspond to the information in the AD server 13A. The updating of user information in the management server 11A includes updating the use limit information.

For example, if new user identifying information 136 has been added in an update file, the user information updating unit 134 stores the initial-setting use limit information in the user information storage device 120 in association with the user identifying information 136. If the user identifying information 136 has been deleted from the update file, the user information updating unit 134 deletes the use limit information associated with the deleted user identifying information from the user information storage device 120.

Thus, in the management server 11A of the present embodiment, the user information can be updated periodically in accordance with the AD server 13A. Thus, there is no need to perform a duplicate information management for the user identifying information 136 in the AD server 13A and for the user information in the management server 11A. Thus, the burden on a system administrator in connection with information management can be reduced.

Furthermore, in the management server 11A of the present embodiment, print jobs stored in the print server 16A can be deleted all at once.

Specifically, in the management server 11A, the print job deletion instructing unit 140 can generate a print job deletion instruction and transmit it to the print server 16A. In response, the print server 16A causes the print job deleting unit 164 to delete the print jobs stored in the print command retaining unit 161.

In the management server 11A, such a print job deletion instruction may be generated periodically and transmitted to the print server 16A. Specifically, the print job deletion instructing unit 140 may generate a print job deletion instruction at certain periods set by the system administrator and transmit the instruction to the print server 16A. Such a print job deletion instruction may instruct deletion of print jobs all at once. In this case, the print server 16A deletes all of the print jobs retained in the print command retaining unit 161 each time the print server 16A receives a print job deletion instruction.

In the management server 11A, a print job deletion instruction may be generated that would delete print jobs accumulated in a predetermined period set by the system administrator. For example, if a setting is made by the system administrator to delete print jobs accumulated in a period of eight days between 10 days ago and two days ago, the print job deletion instructing unit 140 transmits a print job deletion instruction and the period information set by the system administrator to the print server 16A. The print server 16A then deletes the print jobs accumulated in the period designated by the period information.

The print job deletion instructing unit 140 may cause the display device 113 of the management server 11A to display a setting screen prompting the entry of a period information setting or a print job deletion instruction. In this way, the system administrator may set a period and enter a print job deletion instruction on the setting screen.

Thus, in accordance with the present embodiment, accumulation of too much amount of data in the print server 16A can be prevented and so the capacity of the print server 16A can be reduced.

Furthermore, in the management server 11A of the present embodiment, the order of execution of print jobs stored in the print server 16A can be changed by the print order change instructing unit 150.

For example, if the print server 16A is set to execute print jobs in reverse chronological order of their reception, the management server 11A can cause the print order change instructing unit 150 to generate an instruction to change the order to chronological order of reception of the print jobs. The thus generated print order change instruction is transmitted by the management server 11A to the print server 16A, which then changes the order of execution of the print jobs in accordance with the print order change instruction.

The print order change instructing unit 150 may cause the display device 113 of the management server 11A to display a setting screen prompting the entry of a print order change setting. A system administrator can then enter a print order on the setting screen and generate a print order change instruction.

Thus, in accordance with the present embodiment, the order of execution of print jobs can be changed, so that print jobs can be executed by the print server 16A in an appropriate order in accordance with the operation of the image forming apparatus management system 10A.

Embodiment 3

Figure 22:
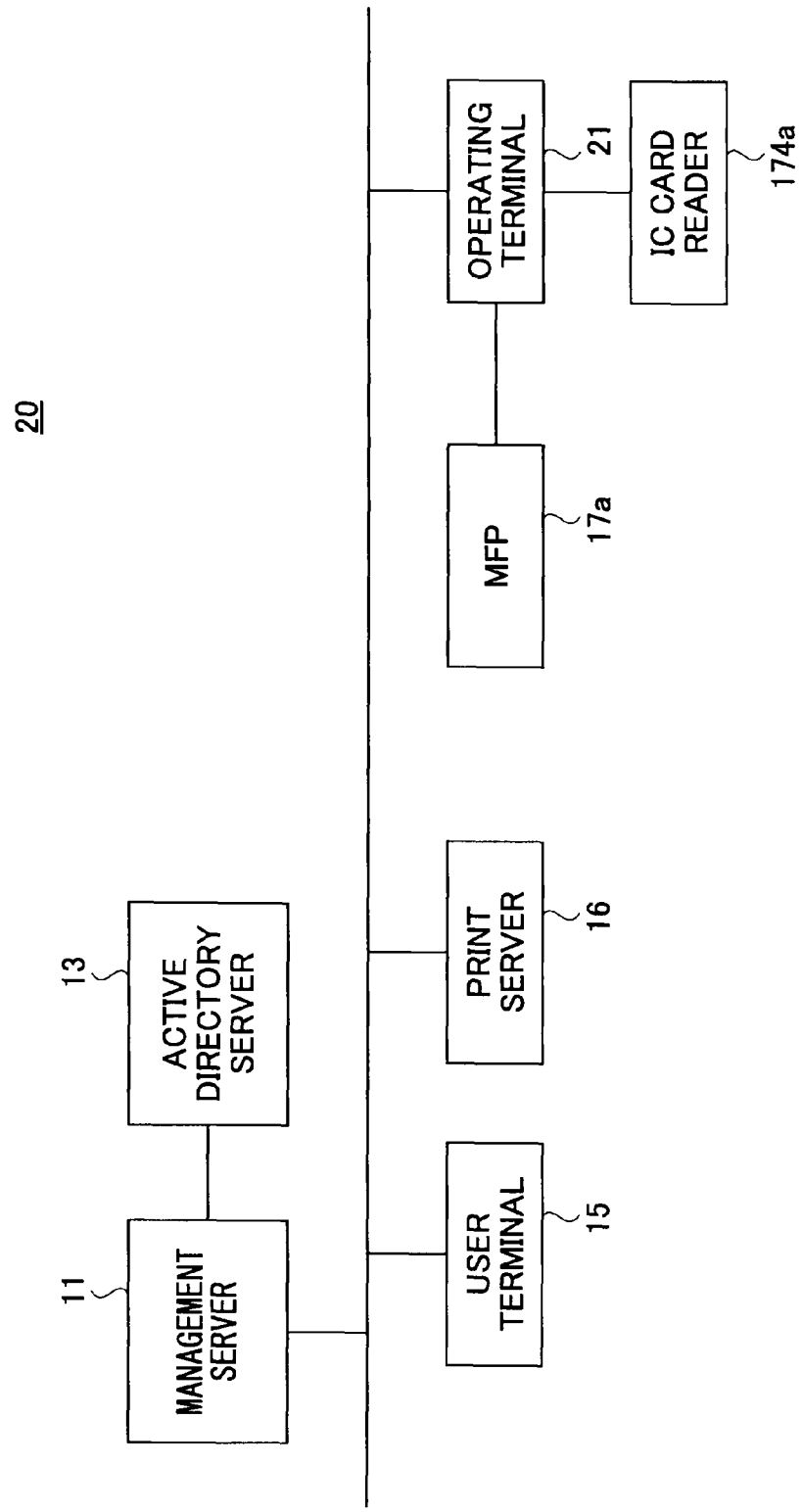
FIG. 22 shows a system configuration of an image forming apparatus management system according to a third embodiment of the invention.

With reference to FIG. 22, a third embodiment of the present invention is described. FIG. 22 shows a system configuration of an image forming apparatus management system 20 according to the third embodiment. Constituent elements of the image forming apparatus management system 20 shown in FIG. 22 that have functions or structures similar to those of the first embodiment shown in FIG. 1 are designated with similar numerals, and their descriptions are omitted; thus, the following descriptions with reference to FIG. 22 are only concerned with portions different from the first embodiment.

Figure 23:
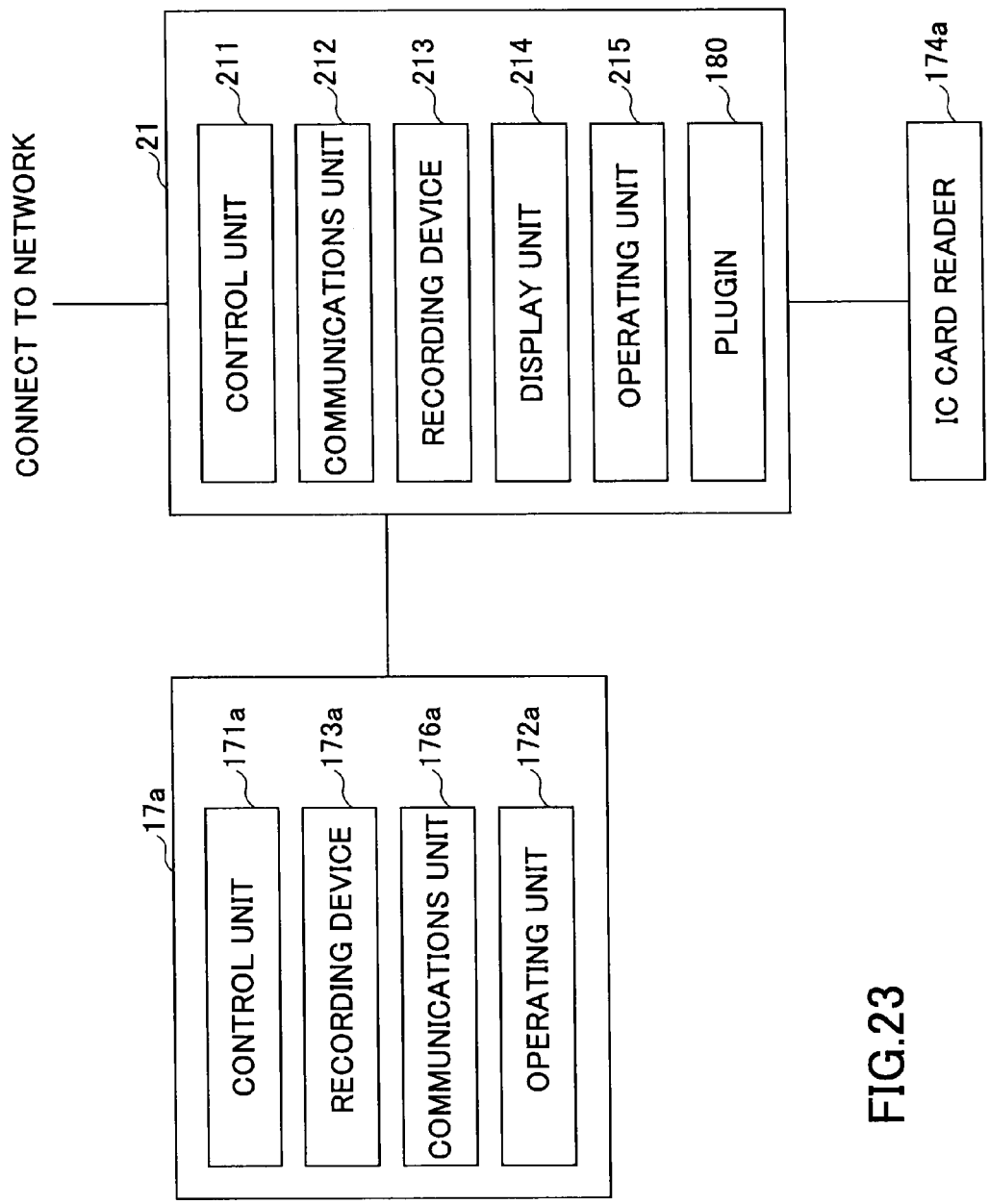
FIG. 23 shows a configuration of an image forming apparatus, an operating terminal, and an IC card reader.

In the image forming apparatus management system 20, the portion that corresponds to the image forming apparatus 17A of the second embodiment is composed of an image forming apparatus 17a, an operating terminal 21 for operating the image forming apparatus 17a, and an IC card reader 174a connected externally of the operating terminal 21. FIG. 23 shows the configuration of the image forming apparatus 17a, the operating terminal 21, and the IC card reader 174a.

The image forming apparatus 17a and the IC card reader 174a are connected to the operating terminal 21, which in turn is connected to a network of which the image forming apparatus management system 20 is formed. In the present embodiment, the image forming apparatus 17a may be serially connected to the operating terminal 21 via an RS232C cable. The IC card reader 174a may be connected to the operating terminal 21 via a USB terminal.

The image forming apparatus 17a comprises a control unit 171a, a display/operating device 172a, a recording device 173a, and a communications unit 176a. The control unit 171a executes or controls processes for realizing a print function, a scan function, a copier function, etc., that the image forming apparatus 17a can provide. The display/operating device 172a is configured to operate the image forming apparatus 17a; it may comprise a numeric keypad or an operating panel. The recording device 173a has recorded setting values or the like concerning the image forming apparatus 17a. The communications unit 176a is configured to perform communications with the operating terminal 21.

The operating terminal 21, which may comprise a computer, includes a control unit 211, a communications unit 212, a recording device 213, a display unit 214, an operating unit 215, and a plugin 180. The control unit 211 executes or controls processes for realizing the functions of the operating terminal 21. The communications unit 212 performs communications with the image forming apparatus 17a, IC card reader 174a, and various devices connected to the network. The plugin 180 is configured as described with reference to the second embodiment. The operating terminal 21 of the present embodiment may include the region setting information generating unit 193 that has been described with reference to the second embodiment. Specifically, a region setting program may be installed on the operating terminal 21.

The recording device 213 retains setting values of the operating terminal 21; it may also temporarily retain operated values obtained as a result of processes performed by the control unit 211. The recording device 213 also retains various other information in case the operating terminal 21 becomes unable to communicate with the management server 11 or the print server 16. Such information includes information concerning the system setting of the image forming apparatus management system 20; user identifying information consisting of IC card identifying information and user ID; use limit information associated with the user identifying information; and information indicating a history of use of the image forming apparatus 17a by each user. These items of information are transmitted to the management server 11 periodically.

The display unit 214 is configured to display the result of a process performed by the operating terminal 21 and the status of the image forming apparatus 17a. The display unit 214 may comprise a liquid crystal display externally connected to the operating terminal 21. The operating unit 215 is configured to operate the operating terminal 215 and may comprise a keyboard and mouse externally connected to the operating terminal 21. The IC card reader 174a provides the same function as that of the second embodiment.

In the following, a user authenticating process in the third embodiment is described. Initially, the IC card identifying information concerning a user is acquired by the IC card reader 174a. Specifically, the control unit 211 of the operating terminal 21 acquires the IC card identifying information via the IC card reader 174a. The acquired IC card identifying information is transmitted to the management server 11 by the communications unit 212. The management server 11 obtains a user ID associated with the IC card identifying information, and acquires use limit information associated with the user ID.

The management server 11 then transmits the thus acquired use limit information to the operating terminal 21 using the communications unit 114. The operating terminal 21 acquires the use limit information via the communications unit 212, and controls the image forming apparatus 17a based on the use limit information.

Thus, in accordance with the third embodiment, the image forming apparatus 17a is managed by the operating terminal 21 and the management server 11.

In the present embodiment, an application for realizing the functions of the plugin 180, the executed process history storing unit 177 as described with reference to the first embodiment, the individual information storing unit 178, and the password generating unit 179 may be recorded on a recording medium that can be read by the operating terminal 21. In this case, the operating terminal 21 may include a recording medium reading unit (not shown) for reading such a recording medium to provide the aforementioned functions. In this case, the operating terminal 21 may execute the process of any of the aforementioned functions that the image forming apparatus 17a can provide and thus control the image forming apparatus 17a.

Embodiment 4

Figure 24:
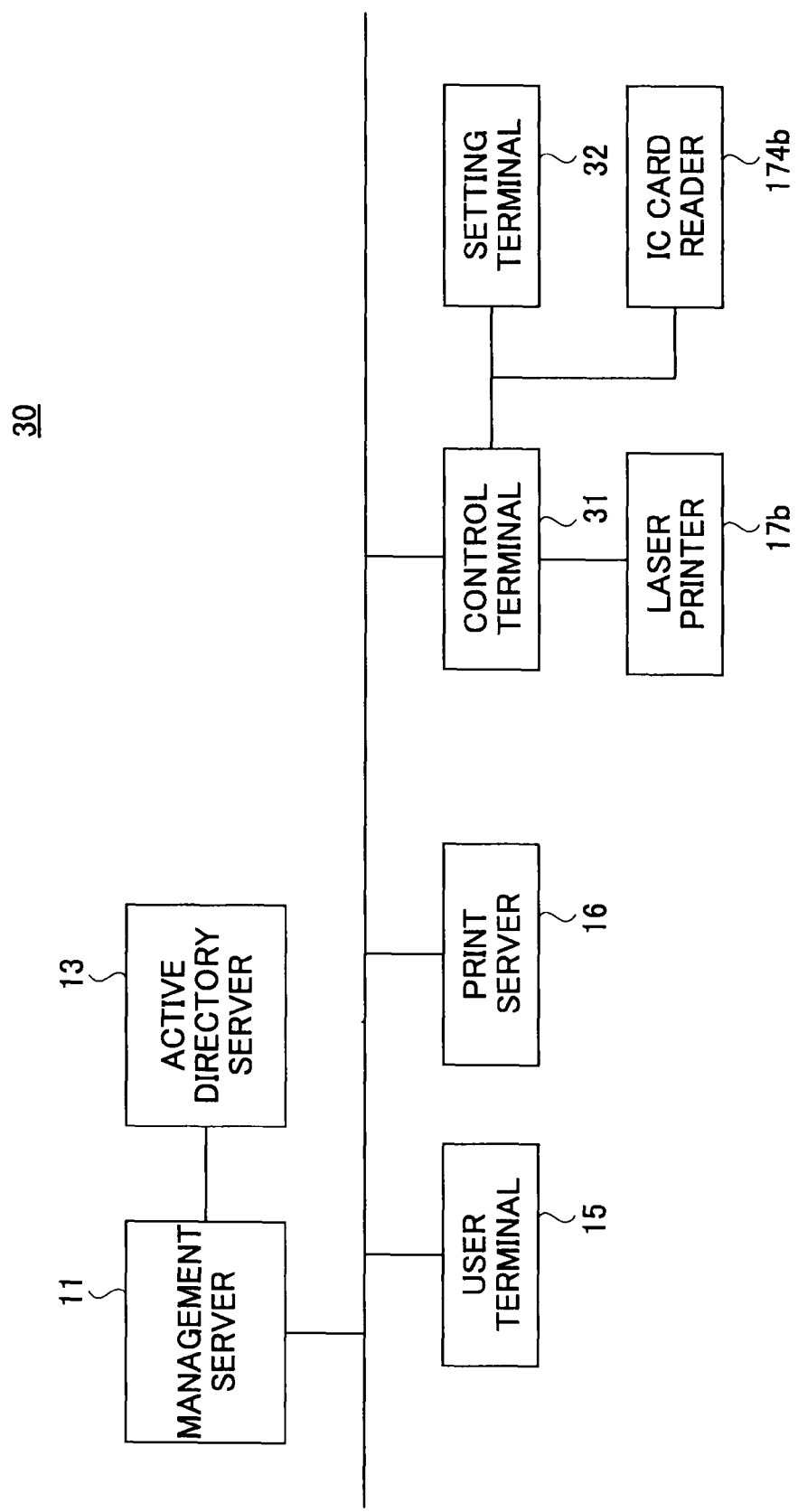
FIG. 24 shows a system configuration of an image forming apparatus management system according to a fourth embodiment of the invention.

With reference to FIG. 24, a fourth embodiment of the present invention is described. FIG. 24 shows a system configuration of an image forming apparatus management system 30 according to the present embodiment. Constituent elements of the image forming apparatus management system 30 shown in FIG. 24 that have functions or structures similar to those of the first embodiment shown in FIG. 1 are designated with similar numerals and their descriptions are omitted. Therefore, the following descriptions with reference to FIG. 24 are concerned only with portions different from the first embodiment.

Figure 25:
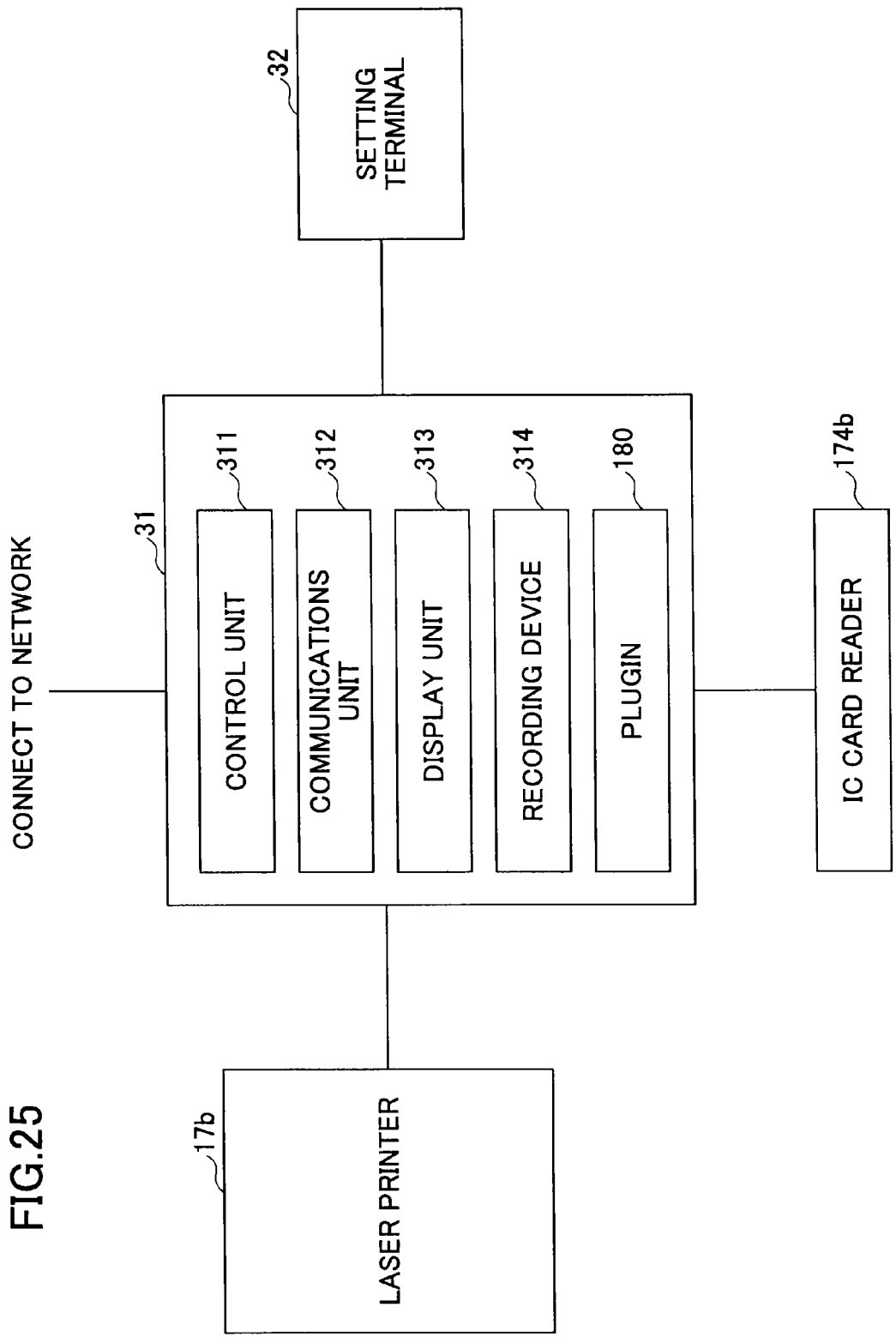
FIG. 25 shows a configuration of a laser printer, a control terminal, a setting terminal, and an IC card reader.

In the image forming apparatus management system 30 of the fourth embodiment, the portion corresponding to the image forming apparatus 17 of the first embodiment is composed of a laser printer 17b as an image forming apparatus, a control terminal 31 configured to control the laser printer 17b, a setting terminal 32 configured to make settings for the control terminal 31, and an IC card reader 174b connected externally of the control terminal. FIG. 25 shows a configuration of the laser printer 17b, the control terminal 31, the setting terminal 32, and the IC card reader 174b.

The laser printer 17b is an image forming apparatus having a printer function. The control terminal 31 includes a control unit 311, a communications unit 312, a display unit 313, a recording device 314, and a plugin 180. The control unit 311 is configured to control processes for realizing the functions of the control terminal 31. The communications unit 312 is configured to perform communications with each of the devices of which the image forming apparatus management system 30 is composed and with the laser printer 17b. The display unit 313 is configured to display the status of the image forming apparatus management system 30 as a whole and the status of communications between the control terminal 31 and each device. The plugin 180 is configured to operate as described above with reference to the second embodiment. The control terminal 31 of the present embodiment may include the region setting information generating unit 193 described with reference to the second embodiment; namely, a region setting program may be installed on the control terminal 31.

The display unit 313 comprises LEDs (Light Emitting Diodes) of three colors. The three colors of the LEDs are combined to display to a user various states of the image forming apparatus management system 30; communications statuses between the control terminal 31 and the management server 11 and the print server 16; and device statuses of the management server 11 and the print server 16. A method of display is described in detail below.

In the recording device 314, setting values or the like of the control terminal 31 are recorded. Further, in the recording device 314, various other information are also stored in case the control terminal 31 becomes unable to communicate with the management server 11 or the print server 16. Such information includes information concerning the system setting of the image forming apparatus management system 30; user identifying information consisting of IC card identifying information and user ID; use limit information associated with the user identifying information; and information indicating a history of use of the laser printer 17b by each user. Such information items are periodically transmitted to the management server 11.

The IC card reader 174b, which has the same function as that of the IC card reader 174a of the second embodiment, may be connected to the control terminal 31 via a USB cable. The setting terminal 32, which may comprise a computer, is configured to make various settings in the control terminal 31. The setting terminal 32 may be connected to the control terminal 31 via a cross cable.

In the following, a user authenticating process in the present embodiment is described. Initially, the IC card identifying information in an IC card of a user is acquired by the IC card reader 174b. Specifically, the control unit 311 of the control terminal 31 acquires the IC card identifying information using the IC card reader 174b. The acquired IC card identifying information is transmitted to the management server 11 by the communications unit 312. The management server 11 obtains a user ID associated with the IC card identifying information, and acquires the use limit information associated with the user ID.

The management server 11 then transmits the acquired use limit information to the control terminal 31 using the communications unit 114. The control terminal 31 acquires the use limit information via the communications unit 312, and controls the laser printer 17b based on the use limit information.

For example, if an authenticated user is subject to a limitation concerning use of the laser printer 17b based on the use limit information, the control unit 311 places the operating keys provided on the laser printer 17b in a hard key lock state, thus rendering the keys unusable. If, on the other hand, an authenticated user is allowed to use the laser printer 17b based on the use limit information, the control unit 311 releases the hard key lock state of the laser printer 17b. Thus, the user can perform a print process using the operating keys on the laser printer 17b.

Thus, in the present embodiment, the control terminal 31 and the management server 11 limit and manage use of the laser printer 17b as the image forming apparatus. In this way, the present invention can be applied to the management of laser printers, which are believed to be more affordable by users than more expensive image forming apparatus, thus providing the effects of the present invention in laser printers.

In the following, a method of display performed by the display unit 313 of the present embodiment is described with reference to FIGS. 26 and 27.

FIGS. 26A through 26M show various display methods for indicating the status of the image forming apparatus management system 30 on the display unit 313. FIGS. 27A through 27D show various display methods for indicating the status of a second print server in a case where plural print servers 16 are connected in the fourth embodiment. Throughout these figures, passage of time is shown in the horizontal direction, where each small square represents one second.

The display unit 313 of the control terminal 31 includes LEDs of three colors: green, red, and yellow. In the present embodiment, LED 1 is green, indicating the power supply status of the control terminal 31. LED 1 turns on when power supply to the control terminal 31 is ON. LED 2 is red, mainly indicating the device status of the control terminal 31. LED 3 is yellow, mainly indicating the device status of the management server 11 and the print server 16, and the communications status between the control terminal 31 and the management server 11 and the print server 16. In the following, various methods of lighting LEDs 2 and 3 are described with reference to FIGS. 26A through 26M.

FIG. 26A indicates abnormality in the state of communication of a service within the control terminal 31 of the display unit 313. The "service" herein refers to a data transmission/reception in the control terminal 31. If there is abnormality in the communication state of the service within the control terminal 31, LED 2 on the display unit 313 blinks once every five seconds. Specifically, LED 2 lights up one second followed by a rest period of four seconds in which none of the LEDs light up, and then LED 2 blinks again. In this way, the display unit 313 notifies the user of communication abnormality regarding a service within the control terminal 31.

FIG. 26B indicates a disc capacity alert on the display unit 313 concerning a local disc in the control terminal 31. If the remaining capacity of the disc in the control terminal 31 drops below a predetermined value, LED 2 blinks twice at one-second intervals, followed by four seconds of a rest period, and then LED 2 blinks twice at a one second interval again. In this way, the display unit 313 notifies the user of a disc capacity alert concerning a local disc in the control terminal 31.

FIG. 26C indicates device abnormality in the IC card reader 174b. In this case, LED 2 blinks three times at one second intervals, followed by four seconds of a rest period, and then blinking again at one second intervals. In this way, the display unit 313 notifies the user of device abnormality in the IC card reader 174b.

FIG. 26D indicates abnormality in the device status of the control terminal 31. The abnormality in the device status of the control terminal 31 includes a failure in the control terminal 31 such that data communication cannot be performed. In this case, LED 3 blinks once every five seconds. Specifically, LED 3 lights up one second, followed by four seconds of a rest period in which none of the LEDs light up. In this way, the display unit 313 notifies the user of abnormality in the device status of the control terminal 31.

FIG. 26E indicates abnormality in the state of communication with the print server 16. In this case, LED 3 blinks twice with a one second interval, followed by a rest period of four seconds, then returning to the blinking with a one second interval. In this way, the display unit 313 notifies the user of abnormality in the communication status between the print server 16 and the control terminal 31.

FIG. 26F indicates abnormality in the status of communication with the management server 11. In this case, LED 3 blinks three times every one second, followed by a rest period of four seconds, then returning to the blinking every one second. In this way, the display unit 313 notifies the user of abnormality in the communication status between the management server 11 and the control terminal 31.

FIG. 26G indicates an internal error in the control terminal 31. The "internal error" indicates that, for example, a process to be performed in the control terminal 31 could not be executed for one reason or another. In this case, LED 2 and LED 3 repeat blinking every one second at the same timing. In this way, the display unit 313 notifies the user of an internal error abnormality in the control terminal 31.

FIG. 26H indicates abnormality in the communication status of a service within the print server 16. In this case, LED 3 blinks four times every one second, followed by a rest period of four seconds, then returning to the blinking every one second. In this way, the display unit 313 notifies the user of abnormality in the communication status of a service in the print server 16.

FIG. 26I indicates a disc capacity alert concerning the print server 16. Specifically, when the remaining disc capacity in the print server 16 drops below a predetermined value, LED 3 blinks five times at one second intervals, followed by a rest period of four seconds, before returning to the blinking at one second intervals. In this way, the display unit 313 notifies the user of a disc capacity alert concerning the print server 16.

FIG. 26J indicates a database capacity alert concerning the print server 16. The database in the print server 16 herein refers to, e.g., a data storage region in the print server 16 where various data are stored. If the remaining capacity of such database in the print server 16 drops below a predetermined value, LED 3 blinks six times every one second, followed by a rest period of four seconds, before returning to the blinking every one second. In this way, the display unit 313 notifies the user of a database capacity alert concerning the print server 16.

FIG. 26K indicates abnormality in the communication status of a service within the management server 11. In this case, LED 3 blinks seven times every one second, followed by a rest period of four seconds, before returning to the blinking at one second intervals. In this way, the display unit 313 notifies the user of abnormality in the communication status of service in the management server 11.

FIG. 26L indicates a disc capacity alert in the management server 11. If the remaining disc capacity in the management server 11 drops below a predetermined value, LED 3 blinks eight times every one second, followed by a rest period of four seconds, before returning to the blinking at one second intervals. In this way, the display unit 313 notifies the user of a disc capacity alert concerning the management server 11.

FIG. 26M indicates a database capacity alert concerning the management server 11. The database in the management server 11 herein refers to, e.g., a data storage region in the management server 11 where various data are stored. If the remaining capacity of such database in the management server 11 drops below a predetermined value, LED 3 blinks nine times every one second, followed by a rest period of four seconds, before returning to the blinking at one second intervals. In this way, the display unit 313 notifies the user of a database capacity alert concerning the management server 11.

Thus, the display unit 313 of the control terminal 31 is configured to display to the user the device status of the control terminal 31, the management server 11, and the print server 16, and the communication status between the control terminal 31 and the management server 11 and the print server 16.

Furthermore, in the image forming apparatus management system 30 of the present embodiment, plural print servers 16 can be provided. A method of displaying information about a second print server (not shown) in this case is described with reference to FIG. 27. In FIG. 27, the exclamation mark "!" indicates a quick blinking where the on-time of an LED is less than one second. For example, "●!●" indicates that the LED blinks twice, each time lighting up for less than one second.

FIG. 27A indicates abnormality in the communication status between the second print server and the control terminal 31. In this case, LED 3 blinks twice with a one second interval, followed by a period of four seconds in which it blinks twice, each time lighting up for less than one second, before returning to the blinking at the one second interval. In this way, the display unit 313 notifies the user of abnormality in the status of communication with the second print server.

FIG. 27B indicates abnormality in the communication status of a service within the second print server. In this case, LED 3 blinks four times at one second intervals, followed by a period of four seconds in which it blinks twice, each time lighting up for less than one second. Then, LED 3 returns to the blinking at one second intervals. In this way, the display unit 313 notifies the user of abnormality in the communication status of a service in the second print server.

FIG. 27C indicates a disc capacity alert concerning the second print server. If the remaining disc capacity in the second print server drops below a predetermined value, LED 3 blinks five times at one second intervals, followed by a period of four seconds in which it blinks twice, each time lighting up for less than one second. Then, LED 3 returns to the blinking at one second intervals. In this way, the display unit 313 notifies the user of a disc capacity alert concerning the second print server.

FIG. 27D indicates a database capacity alert concerning a database in the second print server. The database in the second print server refers to, e.g., a data storage region in the print server in which various data are stored. If the remaining disc capacity in the second print server drops below a predetermined value, LED 3 blinks six times at one second intervals, followed by a period of four seconds in which it blinks twice, each time lighting up for less than one second. LED 3 then returns to the blinking at one second intervals. In this way, the display unit 313 notifies the user of a database capacity alert concerning the second print server.

Thus, in accordance with the present embodiment, even if plural print servers are connected, the control terminal 31 can cause the display unit 313 to display to the user information about the device status of any of the plural print servers or its communication status with the control terminal 31.

Furthermore, a sequence of steps for realizing each of the functions of the management server 11, 11A according to any of the foregoing embodiments can be recorded in a recording medium in the form of a computer-readable image forming apparatus managing program.

Figure 28:
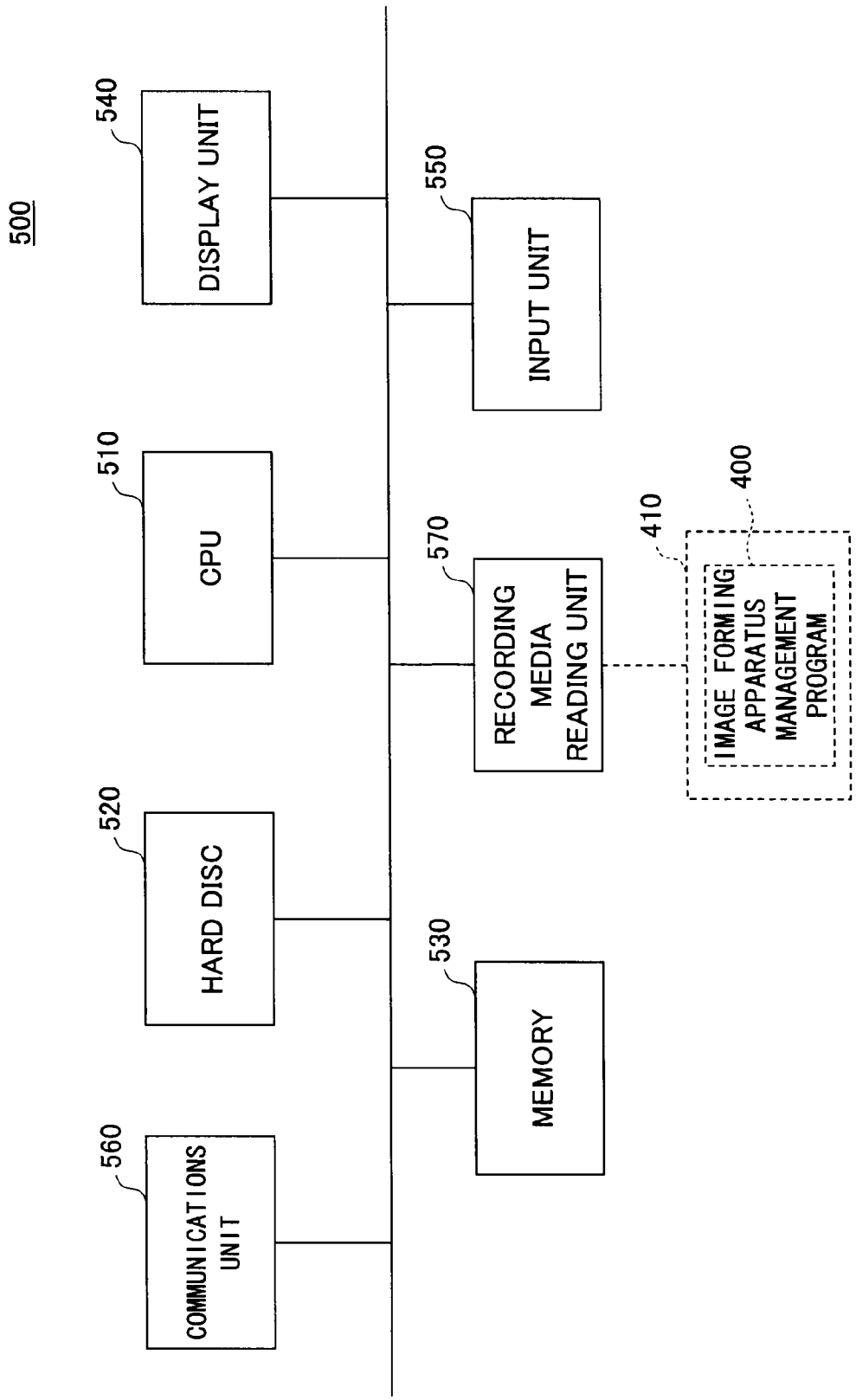
FIG. 28 shows a diagram for describing a recording medium in which a program for realizing various functions of the management servers according to the various embodiments is recorded.

With reference to FIG. 28, a recording medium is described in which medium a program for realizing each function of the management server 11, 11A of any of the foregoing embodiments is recorded. The program may be read by the computer 500 and executed to realize each of the functions of the embodiments.

The computer 500 may comprise a CPU 510, a hard disk 520, a memory 530, a display unit 540, an input unit 550, a communications unit 560, and a recording medium reading unit 570. The CPU 510 is a processing unit configured to execute operations and processes in the computer 500. The hard disk 520 is a data storage unit in which applications run on the computer 500 or data generated by such applications are stored. In the memory 530, various setting values concerning the computer 500 and results of operations in the CPU 510 are saved.

The display unit 540 may comprise a display configured to display data generated in the computer 500 to a user. The input unit 550 may comprise a keyboard and mouse for entering various data by a user operation. The communications unit 560 may comprise a network control unit configured to perform communications between the computer 500 and an external device. The recording medium reading unit 570 is configured to read data or programs recorded on various recording media; it may comprise a flexible disk driver.

In the recording medium 410, an image forming apparatus managing program 400 for realizing the functions of the present embodiment is recorded. The image forming apparatus managing program 400 is read by the recording medium reading unit 570 and then executed by the CPU 510. The recording medium 410 may comprise any medium that can be read by the computer 500, such as a flexible disk or a CD-ROM (Compact Disk Read Only Memory). Alternatively, the image forming apparatus managing program 400 may be received by the communications unit 560 via a network and then stored in the hard disk 520.

Furthermore, a sequence of steps for realizing each of the functions of the image forming apparatus 17, 17A, 17a according to any of the foregoing embodiments may be recorded in a recording medium in the form of a computer-readable image forming program.

With reference to FIG. 29, such a recording medium is described. The program recorded in the medium can be read by the image forming apparatus 600 and then executed to realize the functions that have been described with reference to the present embodiment.

For example, an image forming apparatus 600 comprises a CPU 610, a hard disk 620, a memory 630, a display operating unit 640, a scanner unit 650, a communications unit 660, a recording medium reading unit 670, and a plotter unit 680. The CPU 610 is a processing unit for executing operations and processes in the image forming apparatus 600. The hard disk 620 is a storage unit in which applications run on the image forming apparatus 600 and data generated by such applications are stored. In the memory 630, various setting values of the image forming apparatus 600 and the results of operations executed by the CPU 610 are saved.

The display operating unit 640 may comprise an operating panel having a display unit configured to display information regarding the operation of the image forming apparatus 600, its device status, and the progress of a process. The scanner unit 650, which may comprise a scanner and a scanner engine, is configured to scan a paper document into image data. The communications unit 660 may comprise a network control unit configured to allow the image forming apparatus 600 to communicate with an external device. The recording medium reading unit 670 is configured to read various data or programs recorded in various recording media; it may comprise a flexible disk driver. The plotter unit 680 comprises a plotter and a plotter engine and is configured to print image data.

In the recording medium 710, an image forming program 700 for realizing the functions of the present embodiment is recorded. The image forming program 700 is read by the recording medium reading unit 670 and then executed by the CPU 610. The recording medium 710 may comprise any medium as long as it is readable by the image forming apparatus 600; examples are a flexible disk and a CD-ROM (Compact Disk Read Only Memory). Alternatively, the image forming program 700 may be received by the communications unit 660 via a network and then stored in the hard disk 620.

While the invention has been described with reference to specific embodiments, these embodiments are to be understood as illustrative and do not limit the claim scope. Many variations, modifications, additions and improvements of the described embodiments are possible.

The present application is based on the Japanese Priority Application No. 2007-077763 filed Mar. 23, 2007, the entire contents of which are hereby incorporated by reference.

What is claimed is:

1. An apparatus, comprising:
    a storage unit configured to store region setting information setting at least one of a plurality of reading regions of information to be stored in a recording medium;
    a reading unit configured to read the information to be stored in the recording medium;
    a read control unit configured to control, via a processor, the reading of the information by the reading unit based on the at least one reading region set in the region setting information; and a selection unit configured to receive a selection of the reading of the information from a particular kind of the recording medium from among plural kinds of recording media, wherein the reading unit is configured to read the information from among the plural kinds of recording media having different information formats.

2. The apparatus according to claim 1, wherein the storage unit is configured to store a plurality of region setting information, and wherein the read control unit is configured to control the reading of the information by the reading unit based on the at least one reading region set in the plurality of region setting information, corresponding to a format of the recording medium from among the plurality of region setting information.

3. The apparatus according to claim 1, further comprising:

a conversion unit configured to convert the information that is read based on the at least one reading region into a predetermined information format, wherein the conversion unit is configured to convert the information format of the information read from the recording medium into the predetermined information format.

4. The apparatus according to claim 1, wherein the information includes a plurality of information items which are stored amongst the plurality of reading regions.

5. A reading method, comprising:

storing region setting information setting at least one of a plurality of reading regions of information to be stored in a recording medium;

reading, via a processor, the information to be stored in the recording medium;

controlling, via a processor, the reading of the information based on the at least one reading region set in the region setting information:, receiving a selection of the reading of the information from a particular kind of the recording medium from among plural kinds of recording media; and reading the information from among the plural kinds of recording media having different information formats.

6. The method according to claim 5, further comprising:

storing a plurality of region setting information; and controlling the reading of the information based on the at least one reading region set in the plurality of region setting information corresponding to a format of the recording medium from among the plurality of region setting information.

7. The method according to claim 5, further comprising:

converting the information that is read based on the at least one reading region into a predetermined information format;

converting the information format of the information read from the recording medium into the predetermined information format.

8. The reading method according to claim 5, wherein the information includes a plurality of information items which are stored amongst the plurality of reading regions.

9. An information processing system comprising:

a first apparatus and a second apparatus, wherein the first apparatus includes:

a connection unit configured to communicably connect to the second apparatus via a network;

a first display unit configured to display a first setting screen where at least one of a plurality of reading regions of information to be stored in a recording medium is set and where selection of whether the at least one reading region is to be set in a predetermined region or in an arbitrarily designated region is made;

an accepting unit configured to accept the selection;

a second display unit configured to, when the accepting unit accepts the selection that the at least one reading region is to be set in the arbitrarily designated region, display a second display where an arbitrary region among information to be stored in the recording medium is designated in the at least one reading region; and a transmission unit configured to transmit region setting information where the at least one reading region is set, and wherein the second apparatus includes:

a connection unit configured to communicably connect to the first apparatus via the network;

a receiving unit configured to receive the region setting information; and a storing unit configured to store the region setting information received by the receiving unit.

10. The information processing system according to claim 9, wherein the first apparatus further includes a setting unit configured to set the predetermined region to be set as the at least one reading region as a standard or format of the recording medium when the accepting unit accepts the selection that the at least one reading region is to be set in the predetermined region.

11. The information processing system according to claim 9, wherein the second display includes a block designation part designating a block to read the information.

12. The information processing system according to claim 11, wherein the second display includes a position designation part designating a position in the designated block.

13. The information processing system according to claim 11, wherein the second display includes an information list part indicating a list of information to be read.

14. The information processing system according to claim 9, wherein the first apparatus further includes a setting unit configured to set the predetermined region to be set as the at least one reading region when the accepting unit accepts the selection that the at least one reading region is to be set in the predetermined region, wherein the predetermined region is a region corresponding to recording medium identification information identifying the recording medium or a standard or a format of the recording medium, and wherein the setting unit is configured to set a region where the recording medium identification information is recorded or a region in accordance with a standard or a format of the recording medium to the predetermined region.

15. The information processing system according to claim 9, wherein the second apparatus further includes a reading control unit configured to control reading of information from the recording medium, wherein the reading control unit is configured to control the reading of information based on the region setting information of a particular kind of the recording medium, the particular kind of the recording medium being selected from a plurality kinds of recording media.

16. The information processing system according to claim 9, wherein the second apparatus further includes a reading control unit configured to control reading of information from the recording medium, and a selection unit configured to receive a selection of the reading of the information by the reading control unit from a particular kind of the recording medium from among a plural kinds of recording media from the first apparatus or via a screen displayed on the second apparatus, and wherein the reading control it is configured to control the reading of information based on the region setting information of a particular kind of the recording medium, the particular kind of the recording medium being selected from the plurality kinds of the recording media.

17. The information processing system according to claim 9, wherein the second apparatus further includes a reading control unit configured to control reading of information from the recording medium in accordance with a standard or a format of the recording medium, and wherein the reading control unit is configured to control the reading of information based on the standard or the format of the selected recording medium and the region setting information of the selected recording medium.

18. The information processing system according to claim 9, wherein the second apparatus further includes
a reading control unit configured to control reading of information from the recording medium in accordance with a standard or a format of the recording medium, and
a selection unit configured to receive a selection of the reading of the information by the reading control unit from a particular kind of the recording medium from among a plural kinds of recording media in accordance with the standard or the format of the recording medium from the first apparatus or via a screen displayed on the second apparatus, and wherein the reading control unit is configured to control the reading of information based on the region setting information of a particular kind of the recording medium, the particular kind of the recording medium being selected from the plurality kinds of the recording media.

* * * * *